United States Patent
Shiomi

(10) Patent No.: US 11,682,979 B2
(45) Date of Patent: Jun. 20, 2023

(54) RECTIFIER CIRCUIT, POWER SUPPLY DEVICE, AND RECTIFIER CIRCUIT DRIVE METHOD

(71) Applicant: SHARP KABUSHIKI KAISHA, Sakai (JP)

(72) Inventor: Takeshi Shiomi, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 314 days.

(21) Appl. No.: 17/251,670

(22) PCT Filed: May 29, 2019

(86) PCT No.: PCT/JP2019/021428
§ 371 (c)(1),
(2) Date: Dec. 11, 2020

(87) PCT Pub. No.: WO2019/239901
PCT Pub. Date: Dec. 19, 2019

(65) Prior Publication Data
US 2021/0281185 A1  Sep. 9, 2021

(30) Foreign Application Priority Data

Jun. 15, 2018  (JP) .................................. 2018-114858

(51) Int. Cl.
*H02M 3/335*  (2006.01)

(52) U.S. Cl.
CPC .............................. *H02M 3/33592* (2013.01)

(58) Field of Classification Search
None
See application file for complete search history.

(56) References Cited

U.S. PATENT DOCUMENTS

| | | | | |
|---|---|---|---|---|
| 5,734,563 A | * | 3/1998 | Shinada | H02M 3/33592 |
| | | | | 363/21.06 |
| 6,532,160 B2 | * | 3/2003 | Hirokawa | H02M 1/34 |
| | | | | 363/52 |
| 8,004,867 B2 | * | 8/2011 | Nakahori | H02M 3/01 |
| | | | | 363/56.05 |
| 2013/0152624 A1 | | 6/2013 | Arisawa et al. | |

FOREIGN PATENT DOCUMENTS

| | | |
|---|---|---|
| JP | 2011-036075 A | 2/2011 |
| JP | 2012-070580 A | 4/2012 |
| JP | 2013-198298 A | 9/2013 |
| JP | 2013198298 A * | 9/2013 |

* cited by examiner

*Primary Examiner* — Jeffrey A Gblende
(74) *Attorney, Agent, or Firm* — ScienBiziP, P.C.

(57) ABSTRACT

A transient current in a rectifier circuit is effectively reduced. In a rectifier circuit, a first rectifier is provided between a first terminal and a second terminal. In the rectifier circuit, when a switch element is turned ON, a primary winding current flows from a power supply to a primary winding of a transformer. When the switch element is turned OFF, a second rectifier current flows from a secondary winding of the transformer to a second rectifier. During a period in which the second rectifier current is flowing, a reverse voltage is applied between the first terminal and the second terminal.

4 Claims, 9 Drawing Sheets

RECTIFIER CIRCUIT, POWER SUPPLY DEVICE, AND RECTIFIER CIRCUIT DRIVE METHOD

TECHNICAL FIELD

The following disclosure relates to a rectifier circuit.

BACKGROUND ART

A rectifier circuit provided to a power supply circuit uses such a rectifier as a metal-oxide semiconductor field-effect transistor (MOSFET), or a first recovery diode (FRD). This rectifier includes a diode having a PN junction.

When a forward voltage is applied to the rectifier, a current flows through the PN junction, and the PN junction stores electric charges. After that, when a reverse voltage is applied to the rectifier, the electric charges stored in the PN junction flow through the rectifier as a transient current. After the transient current finishes flowing, the current flowing through the rectifier stops. This transient current is also referred to as a reverse recovery current. The reverse recovery current causes a loss (more specifically, a switching loss) in the rectifier circuit (a power supply circuit).

Patent Documents 1 and 2 each disclose a circuit a purpose of which is to reduce the reverse recovery current. For example, the circuit disclosed in the Patent Document 1 includes a diode and a transformer connected in parallel to a semiconductor switching element to reduce the reverse recovery current. Patent Document 2 also discloses a circuit similar to that of Patent Document 1.

CITATION LIST

Patent Literature

[Patent Document 1] Japanese Unexamined Patent Application Publication No. 2011-036075
[Patent Document 2] Japanese Unexamined Patent Application Publication No. 2013-198298

SUMMARY

Technical Problem

There is still room for improvement in the technique of reducing a transient current in a rectifier circuit as will be described later in detail. The present disclosure, in an aspect thereof, has an object to effectively reduce a transient current in a rectifier circuit.

Solution to Problem

In order to solve the above problem, a rectifier circuit according to an aspect of the present disclosure includes: a first terminal; and a second terminal. With reference to the first terminal, a positive voltage to be applied to the second terminal is a forward voltage. With reference to the second terminal, a positive voltage to be applied to the first terminal is a reverse voltage. If the forward voltage is applied, a forward rectifier circuit current flows from the second terminal to the first terminal. If the reverse voltage is applied, the forward rectifier circuit current is blocked. The rectifier circuit further includes: a first rectifier connected to the first terminal and the second terminal; a transformer including a primary winding and a secondary winding; a second rectifier connected in parallel to the first rectifier through the secondary winding; a switch element connected to the primary winding; and a power supply connected to the primary winding. When the switch element is turned ON, a primary winding current flows from the power supply to the primary winding. When the switch element is turned OFF, a second rectifier current flows from the secondary winding to the second rectifier. During a period in which the second rectifier current is flowing, the reverse voltage is applied.

Moreover, in order to solve the above problem, a method according to an aspect of the present disclosure is a rectifier circuit drive method for driving a rectifier circuit including: a first terminal; and a second terminal. In the rectifier circuit, with reference to the first terminal, a positive voltage to be applied to the second terminal is a forward voltage, with reference to the second terminal, a positive voltage to be applied to the first terminal is a reverse voltage, if the forward voltage is applied, a forward rectifier circuit current flows from the second terminal to the first terminal, and if the reverse voltage is applied, the forward rectifier circuit current is blocked. The rectifier circuit further includes: a first rectifier connected to the first terminal and the second terminal; a transformer including a primary winding and a secondary winding; a second rectifier connected in parallel to the first rectifier through the secondary winding; a switch element connected to the primary winding; and a power supply connected to the primary winding. The rectifier circuit drive method includes: applying the forward voltage, so that the forward rectifier circuit current flows; turning the switch element ON after the applying the forward voltage, so that a primary winding current flows from the power supply to the primary winding; turning the switch element OFF after the turning the switch element ON, so that a second rectifier current flows from the secondary winding to the second rectifier, and applying the reverse voltage, after the turning the switch element OFF, during a period in which the second rectifier current is flowing.

Advantageous Effects of Disclosure

A rectifier circuit according to an aspect of the present disclosure can effectively reduce a transient current in the rectifier circuit. Moreover, a rectifier circuit drive method according to an aspect of the present disclosure also achieves similar advantageous effects.

DESCRIPTION OF EMBODIMENTS

First Embodiment

Figure 1:
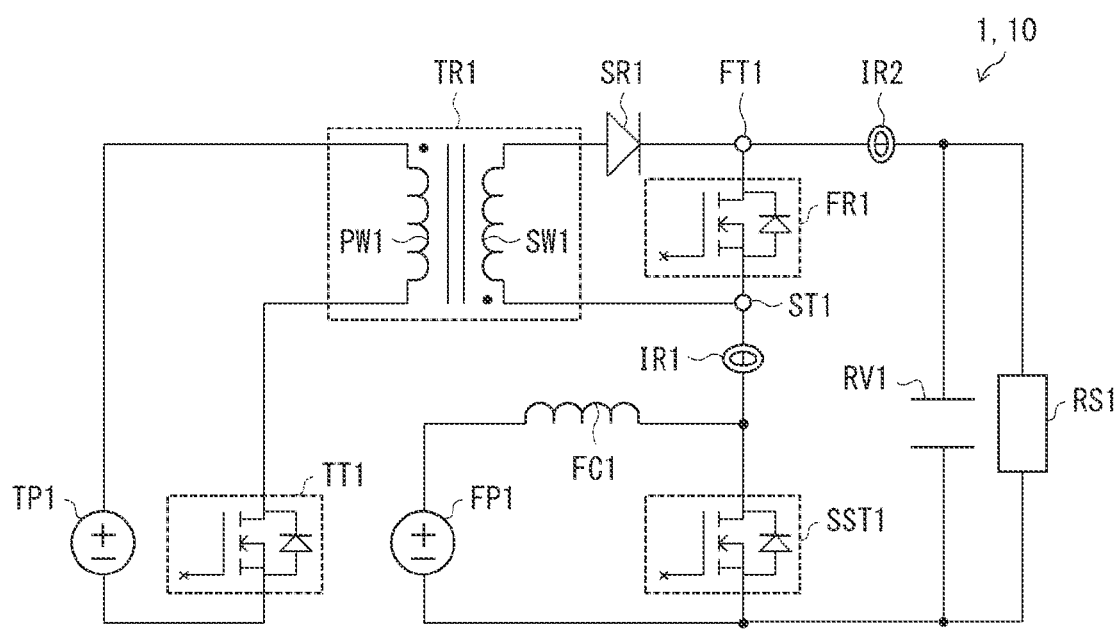
FIG. 1 is a circuit diagram of a power supply circuit according to a first embodiment.

Described below is a rectifier circuit 1 of a first embodiment. For convenience of description, members of a second embodiment and any subsequent embodiments that have the same function as members described in the first embodiment will be indicated by the same reference numerals, and the description thereof shall be omitted.

Purpose of Rectifier Circuit 1

As described above, a rectifier having a PN junction conducts a reverse recovery current (a transient current). Recent years have seen active developments of rectifiers (compound semiconductor devices) with no PN junction. Examples of such rectifiers include SiC-Schottky barrier diodes (SBDs) or GaN-high electron mobility transistors (HEMTs). The rectifiers do not have any PN junction to store electric charges. Hence, such a rectifier does not generate a reverse recovery current.

The rectifier, however, has parasitic capacitance. Hence, when a voltage (corresponding to a reverse voltage of the PN junction) is applied to the rectifier in a direction to block (to stop) a current, a current (a charge current) transiently flows through the rectifier to store the parasitic capacitance. This charge current is also an example of the transient current. After the charge current (the transient current) finishes flowing, the current flowing through the rectifier stops. This charge current also causes a loss in the power supply circuit as the reverse recovery current does in a rectifier having the PN junction.

Both the reverse recovery current and the transient current are transiently generated when a voltage is applied to the rectifier. Hence, in DESCRIPTION, the reverse recovery current and the transient current are collectively referred to as a transient current with no distinction. The rectifier circuit 1 is newly created by an inventor of the present application (hereinafter the inventor) for the purpose of reducing (i) the transient current, and (ii) the loss due to the transient current.

Definition of Terms

Various terms used in DESCRIPTION are defined below prior to a description of the rectifier circuit 1.

A forward voltage is a voltage to make a rectifier conductive. For example, when the rectifier is a diode, the forward voltage is applied to the diode such that the diode conducts a forward current. Consider, as another example, a case where the rectifier is a MOSFET or a GaN-HEMT. That is, consider a case where the rectifier includes a gate (a gate terminal), a source (a source terminal), and a drain (a drain terminal). The forward voltage in such a case is a voltage to make the rectifier conductive if a positive (plus) voltage is applied to the source with reference to the drain when the gate is OFF (when the gate voltage is below or equal to a threshold voltage). The GaN-HEMT may be of any given type. The GaN-HEMT may be of either a cascode type, or an E-mode (a normally-off) type. Note that the forward voltage is also referred to as a positive voltage to be applied to a second terminal (to be described later) of the rectifier circuit with reference to a first terminal (to be described later) of the rectifier circuit. A current to flow in the rectifier circuit in accordance with the application of the voltage is referred to as a forward current of the rectifier circuit. As will be seen below, the forward current may also be referred to as a rectification current.

A reverse voltage is a voltage to make the rectifier non-conductive. That is, when applied to the rectifier, the reverse direction is applied in a direction to keep the rectifier from conducting the forward current. For example, if the rectifier is a diode, the reverse voltage is applied to the diode to keep the diode from conducting the forward current. Consider, as another example, a situation case where the rectifier is a MOSFET or a GaN-HEMT. The reverse voltage in such a case is a positive (plus) voltage to be applied to the drain with reference to the source when the gate is OFF. The reverse voltage to be applied to the rectifier can keep a main current from flowing in the rectifier. Note that the reverse voltage is also referred to as a positive voltage to be applied to the first terminal with reference to the second terminal. When the voltage is applied to the first terminal, the rectifier circuit does not conduct the forward current.

A transient current is a collective term for (i) a reverse recovery current and (ii) a charge current due to parasitic capacitance of the rectifier. In other words, the transient current is transiently generated when the reverse voltage is applied to the rectifier. This transient current causes a loss (more specifically, a switching loss). In the rectifier circuit 1 illustrated in FIG. 1, the transient current can be measured at an IR1 and an IR2 to be described later.

A rectification function is to allow a current to flow (run) in only a certain direction (one direction), and to keep the current from flowing in a direction opposite to the certain direction (to block the current). For example, when the rectifier is a diode, the diode (i) allows a forward current to flow therethrough and (ii) blocks a reverse current. Such a function of the diode is an example of the rectification function. Consider, as another example, a case where the rectifier is a MOSFET or a GaN-HEMT. When the gate is OFF, the rectification function in such a case allows a current to flow from the source to the drain, and blocks a current flowing from the drain to the source. Such a function of the rectifier is another example of the rectification function. When the rectifier is a MOSFET or a GaN-HEMT, the rectification function may be carried out with (i) the source replaced with the anode (the anode terminal) of the diode, and (ii) the drain replaced with the cathode (the cathode terminal) of the diode. Hence, in the description of the rectifier below, the terms "source" and "drain" are respectively referred to as the terms "anode" and "cathode" as deemed appropriate.

A rectifier is a collective term for devices capable of the rectification function. The diode, the MOSFET, and the GaN-HEMT described above are an example of the rectifier. When the rectifier is the MOSFET or the GaN-HEMT, (i) the drain is connected to the first terminal of the rectifier circuit, and (ii) the source is connected to the second terminal of the rectifier circuit. Note that the term "connection" in DESCRIPTION means "electrical connection" unless otherwise specified. In connecting together (i) the drain and the first terminal, and (ii) the source and the second terminal, a device (including a winding of a transformer) may be interposed therebetween as necessary.

A rectification current is a forward current flowing in the rectifier or the rectifier circuit. In the rectifier circuit 1 illustrated in FIG. 1, the rectification current can be measured at the IR1 and the IR2.

A switch function (switching function) is to select whether the current flows from the drain to the source of a device (whether the circuit is closed or open) only by ON (when the gate voltage exceeds the threshold voltage) and OFF (when the gate voltage is below or equal to the threshold value) of the gate of the device. The device having the switch function is referred to as a switch device (a switching device).

Brief Description of Function of Rectifier Circuit

Described below is a basic operation of a rectifier circuit (e.g., the rectifier circuit 1) according to an aspect of the present disclosure. Moreover, the rectifier circuit may include an additional function whose details may be omitted in DESCRIPTION. For example, the rectifier circuit may additionally include a synchronous rectification function. The rectifier circuit according to an aspect of the present disclosure includes: the first terminal; and the second terminal. The first and second terminals satisfy the two conditions below.

The first condition is that, if a positive voltage is applied to the second terminal with reference to the first terminal (i.e., if the forward voltage is applied), the rectification current (the forward current) flows in the rectifier circuit. The first condition is equivalent to the forward characteristic of a diode. For example, when a low forward voltage of approximately 1 V is applied, a forward current in a predetermined amount (e.g., a current ranging in the order from 1 A to 100 A) can be generated. The amount of the forward current is significantly affected by characteristics of the devices (e.g., a coil) to be provided to the rectifier circuit.

The second condition is that, if a positive voltage is applied to the first terminal with reference to the second terminal (i.e., if the reverse voltage is applied), the rectification current can be blocked in the rectifier circuit. The second condition is equivalent to the reverse characteristic of a diode. For example, even if a reverse voltage of approximately 400 V is applied, a reverse current to flow is small in amount (e.g. a current ranging in the order from 1 nA to 1 µA). As a matter of course, the second condition excludes a high voltage exceeding breakdown voltage characteristics of the devices of the rectifier circuit.

Hence, the characteristics between the first and second terminals of the rectifier circuit are equivalent to those between the anode and the cathode of a diode. Specifically, the first terminal is equivalent to the cathode, and the second terminal is equivalent to the anode.

The rectifier circuit according to an aspect of the present disclosure includes: a first rectifier (e.g., an FR1); and a second rectifier (e.g., an SR1). As an example, if the first rectifier is an insulated-gate bipolar transistor (IGBT) including diodes connected together in inverse parallel, the rectifier circuit per se can be used as a circuit having the switch function. In such a case, the rectifier circuit is applicable to, for example, a bi-directional chopper circuit, an inverter circuit, or a totem pole power factor correction (PFC) circuit. As an example, the IGBT may be replaced with a MOSFET including a parasitic diode. Alternatively, the IGBT may be replaced with a GaN-HEMT.

Outline of Power Supply Circuit 10

FIG. 1 is a circuit diagram of a power supply circuit 10. The power supply circuit 10 includes the rectifier circuit 1. (Also see FIG. 12.) An example of the power supply circuit 10 is a step-up chopper circuit. The rectifier circuit 1 acts as a rectifier of the power supply circuit 10. The power supply circuit 10 is a known power supply circuit whose rectifier is replaced with the rectifier circuit 1. The following description includes numerical values for explanatory purposes only.

Described first are main constituent features of the power supply circuit 10 except the rectifier circuit 1. A power supply FP1 is an input power supply of the power supply circuit 10 (a step-up chopper circuit). The power supply FP1 has a voltage (an input voltage) of 200 V. A load RS1 is connected to the output of the power supply circuit 10. When the power supply circuit 10 is in a steady state (hereinafter simply referred to as a steady state), the load RS1 consumes a power of approximately 2,800 W.

A capacitor RV1 is a smoothing capacitor of the power supply circuit 10. The capacitor RV1 is connected in parallel to the load RS1. The capacitor RV1 smooths an output voltage (a voltage to be applied to the load RS1) of the power supply circuit 10. In a steady state, the output voltage is 400 V. As can be seen, the power supply circuit 10 is designed so that the output voltage is twice as large as the input voltage. The capacitor RV1 has a capacitance of 3.3 mF. A coil (an inductor) FC1 is a step-up coil of the power supply circuit 10. Hereinafter, a current to flow through the coil FC1 is referred to as a coil current. In a steady state, the coil current is an average of 14 A. The coil FC1 has an inductance of 500 pH.

Described next are constituent features of the rectifier circuit 1. The rectifier circuit 1 includes: a first rectifier FR1; a second rectifier SR1; a transformer TR1; a switch element TT1; a power supply TP1; a first terminal FT1; and a second terminal ST1.

The first rectifier FR1 is an example of the above first rectifier. The first rectifier FR1 is provided between the first terminal FT1 and the second terminal ST1. In the example of FIG. 1, the first rectifier FR1 includes a low-breakdown-voltage Si-MOSFET and a high-breakdown-voltage GaN-HEMT. The first rectifier FR1 is a cascode of the high-breakdown-voltage GaN-HEMT and the low-breakdown-voltage Si-MOSFET. Such a GaN-HEMT is also referred to as a cascode GaN-HEMT. In the example of FIG. 1, the cascode GaN-HEMT is illustrated by the same circuit symbol as that of the MOSFET.

The cascode GaN-HEMT and the MOSFET have the same rectification function. Note that the cascode GaN-HEMT and the MOSFET generate a different amount of transient current. However, both the cascode GaN-HEMT and the MOSFET are common in a function to show certain breakdown voltage characteristics when the reverse voltage is applied thereto. Moreover, both the cascode GaN-HEMT and the MOSFET can carry out synchronous rectification when the gate is turned ON while the rectification current (the forward current) is flowing.

The cascode GaN-HEMT to be used as the first rectifier FR1 has a reverse breakdown voltage of 650 V. Furthermore, the cascode GaN-HEMT has an ON resistance of 50 mf. A GaN-HEMT can stand a relatively high voltage for a short period of time. Hence, the cascode GaN-HEMT can stand a voltage up to 800 V within 1 psec.

The power supply circuit 10 further includes a switch element SST1. The switch element SST1 excites the coil FC1, and functions as a switch to increase a coil current. In a steady state, the switch element SST1 turns ON when the duty cycle is 50% The switch element SST1 has a drive frequency of 100 kHz. In the example of FIG. 1, the switch element SST1 is the same element as the first rectifier FR1. Note, however, that unlike the first rectifier FR1, the switch element SST1 is not intended to be used as a rectifier. The switch element SST1 is used exclusively as a switch. When the gate is turned ON, the switch element SST1 allows a current to flow from the drain to the source. Moreover, when the gate is turned OFF, the switch element SST1 blocks the current.

The second rectifier SR1 is an example of the above second rectifier. In the example of FIG. 1, the second rectifier SR1 is a SiC-SBD. The second rectifier SR1 has a breakdown voltage of 650 V. Furthermore, the second rectifier SR1 has a forward voltage of 0.9 V when starting to conduct a current. The second rectifier SR1 has a resistance of 50 mΩ when conducting a forward current. The second rectifier SR1 is connected in parallel to the first rectifier FR1 through a secondary winding SW1 to be described later.

The transformer TR1 includes: a primary winding PW1; and the secondary winding SW1. The number of turns in the primary winding PW1 (hereinafter N1) is nine. The primary winding PW1 has an inductance of 1.6 pH. The primary winding PW1 has a resistance (a winding resistance) of 10 mΩ. The inductance of the primary winding PW1 is also referred to as an excitation inductance. The transformer TR1 stores energy (more specifically, magnetic energy) in the excitation inductance to generate in the secondary winding SW1 a current corresponding to a current (a primary winding current) to flow in the primary winding PW1. The number of turns in the secondary winding (hereinafter N2) is six. The secondary winding SW1 has a resistance of 7 mΩ.

The switch element TT1 is connected to the primary winding PW1. The switch element TT1 is the same element as the first rectifier FR1. Note that, like the switch element SST1, the switch element TT1 is also used exclusively as a switch. Note that, unlike the first rectifier FR1, the switch element TT1 is not intended to be used as a rectifier, either.

The gate terminals (the gates) included in the rectifiers and the switch elements provided to the power supply circuit 10 are connected to a control circuit 8 (a controller) to be described later. The control circuit 8 is not shown in such a drawing as FIG. 1. See FIG. 12. The gates are switched between ON and OFF (turned ON and OFF) by the control circuit 8. This feature is the same in the second embodiment and any subsequent embodiments.

The power supply TP1 is connected to the primary winding PW1. The power supply TP1 has a voltage of 15 V. The power supply TP1 supplies energy to the primary winding PW1 so that the primary winding PW1 stores the supplied energy. The primary winding PW1 transforms the voltage energy, supplied from the power supply TP1, into magnetic energy. The primary winding PW1 then stores the magnetic energy.

The first terminal FT1 is an example of the above first terminal. In the rectifier circuit 1, the path branches out with reference to the first terminal FT1 into a path to the first rectifier FR1 and a path to the secondary winding SW1. The first terminal FT1 is connected to the secondary winding SW1 through the second rectifier SR1. More specifically, the first terminal FT1 is connected to the cathode of the second rectifier SR1. The first terminal FT1 is connected to the second rectifier SR1 through the first rectifier FR1. Furthermore, the first terminal FT1 is connected to the cathode of the first rectifier FR1.

The second terminal ST1 is an example of the above second terminal. In the rectifier circuit 1, the path further branches out with reference to the second terminal ST1 into a path to the first rectifier FR1 and a path to the secondary winding SW1. The second terminal ST1 is directly connected to the secondary winding SW1. The second terminal ST1 is connected to the anode of the second rectifier SR1 through the secondary winding SW1. Furthermore, the second terminal ST1 is connected to each of (i) the anode of the first rectifier FR1, and (ii) the drain of the switch element SST1.

In the example of FIG. 1, the second rectifier SR1 is disposed closer to the first terminal FT1, and the secondary winding SW1 is disposed closer to the second terminal ST1. Note that such an arrangement is an example. In the rectifier circuit according to an aspect of the present disclosure, the second rectifier SR1 and the secondary winding SW1 may interchangeably be arranged.

In the power supply circuit 10, the power supply FP1, the coil FC1, the switch element SST1, the first rectifier FR1, the capacitor RV1, and the load RS1 constitute a typical step-up chopper circuit. In the typical step-up chopper circuit, the first rectifier FR1 alone is provided as a rectifier.

In contrast, the power supply circuit 10 further includes, other than the first rectifier FR1, the following features as a rectifier: the second rectifier SR1; the transformer TR1 (the primary winding PW1 and the secondary winding SW1); the switch element TT1; the power supply TP1; the first terminal FT1; and the second terminal ST1.

In FIG. 1, each of the IR1 and IR2 is a current measurer. The current measurers IR1 and IR2 can measure a rectification current of the rectifier circuit. Note that neither the current measurer IR1 nor the current measurer IR2 is a current sensor. A measurement result of the rectification current described in DESCRIPTION is obtained as a result of measurement by the current measurers IR1 and IR2. Both of the current measurers IR1 and IR2 measure the same current value. The rectification current can be measured by any given current sensor. That is, the rectification current may be measured by any given technique. Examples of such a technique include use of a hall element type current sensor, a current transformer (CT) sensor, and a combination of a Rogowskii coil and a shunt resistor. In DESCRIPTION, as to a direction of a current to be measured (a detection direction) by the current measurers IR1 and IR2, the current flowing from the second terminal ST1 toward the first terminal FT1 is a positive current. The current measurers IR1 and IR2 can also measure the transient current. This transient current is measured as an instantaneous negative current.

Comparative Example

Described below is an example of an operation of a typical step-up chopper circuit as a comparative example of the power supply circuit 10 (a comparative example of the rectifier circuit 1). For the sake of description, the step-up chopper circuit of the comparative example is referred to as a power supply circuit 10r. The power supply circuit 10r includes: the power supply FP1; the coil FC1; the switch element SST1; the first rectifier FR1; and the capacitor RV1. In other words, the power supply circuit 10r is the power supply circuit 10 without the second rectifier SR1; the transformer TR1; the switch element TT1; and the power supply TP1.

As can be seen, the power supply circuit 10r includes the first rectifier FR1 alone as a rectifier. Note that, in view of the power supply circuit 10 (the rectifier circuit 1), the first rectifier FR1 (one element) of the power supply circuit 10r is also nominally referred to as a rectifier circuit. The circuitry configuration of the elements of the power supply circuit 10r is the same as that illustrated in FIG. 1, unless otherwise specified.

During the operation of the power supply circuit 10r, a reverse voltage and a forward voltage are alternately applied to the first rectifier FR1. The transient current is generated while the reverse voltage is applied. Described below is the operation of the power supply circuit 10r.

(1) First, in an ON period of the switch element SST1, the drain voltage is substantially equal to the source voltage in the switch element SST1. The drain of the switch element SST1 and the anode of the first rectifier FR1 are connected to a common node for the sake of the electric circuit. Hence, a difference in potential between the drain of the switch element SST1 and the anode of the first rectifier FR1 is almost 0 V.

The cathode of the first rectifier FR1 is connected to a positive electrode (a voltage of 400 V) of the capacitor RV1. Hence, a reverse voltage of 400 V is applied to the first rectifier FR1. The coil FC1 has one terminal connected to a positive electrode (a voltage of 200 V) of the power supply FP1. The coil FC1 has another terminal connected to the drain (a voltage of approximately 0 V) of the switch element SST1. Hence, a voltage of approximately 200 V is applied to the coil FC1. The voltage applied to the coil FC1 increases the coil current as time passes. In the ON period of the switch element SST1, (an ON period corresponding to a 50% duty cycle), the coil current that increases as time passes flows from the coil FC1 toward the switch element SST1. The coil current flows through a path including the positive electrode of the power supply FP1, the coil FC1, the switch element SST1, and the negative electrode of the power supply FP1 in the stated order.

(2) Next, the switch element SST is switched from ON (an ON state) to OFF (an OFF state). When the switch element SST is switched, a parasitic capacity of the switch element SST1 is stored. As a result, the drain voltage of the switch element SST1 rises. When the drain voltage exceeds the voltage (400 V) of the positive electrode of the capacitor RV1, a forward voltage is applied to the first rectifier FR1. As a result, a forward current (a rectification current) flows in the first rectifier FR1.

As an example, consider a case where the drain voltage rises to approximately 401 V. Here, in the first rectifier FR1, the anode has a voltage of approximately 401 V and the cathode has a voltage of 400 V. Hence, a forward voltage of approximately 1 V is applied to the first rectifier FR1. In an OFF period of the switch element SST1 (an OFF period corresponding to a 50% duty cycle), the rectifier FR1 conducts the rectification current. The amount of the rectification current depends on the current of the coil FC1. The rectification current decreases as time passes.

(3) After that, the switch element SST1 is switched from OFF to ON. When the switch element SST1 is switched, the drain voltage of the switch element SST1 falls. Along with the fall of the drain voltage, the anode voltage of the rectifier FR1 also falls. Meanwhile, the cathode voltage of the first rectifier FR1 is kept fixed to 400 V. This is because the cathode of the first rectifier FR1 is connected to the positive electrode of the capacitor RV1. Hence, along with the fall of the drain voltage of the switch element SST1, a reverse voltage is applied to the first rectifier FR1. As a result, a transient current flows in the first rectifier FR1. This transient current includes a reverse recovery component (a component of a reverse recovery current) of the diode.

As can be seen, the first rectifier FR1 is a cascode GaN-HEMT. Hence, the transient current more or less includes a reverse recovery current of a parasitic diode in a low-breakdown-voltage Si-MOSFET. The transient current includes as a main component a charge current due to the storage of the parasitic capacity. Noted that, in DESCRIPTION, components of the transient current will not be distinguished from one another. When the transient current flows in the first rectifier FR1, a loss occurs. When the transient current finishes flowing, the drain voltage of the switch element SST1 falls approximately to 0V. Moreover, to the first rectifier FR1, a reverse voltage of 400 V is applied.

The power supply circuit 10r (a step-up chopper circuit) repeats the operations (1) to (3). The first rectifier FR1 is kept ON during a period corresponding to a 50% duty cycle at a drive frequency of 100 kHz (e.g., a cycle of 10 μsec). Thus, a forward voltage and a reverse voltage are alternately applied to the first rectifier FR1 for every 5 psec. As can be seen, the switch element SST1 is turned ON at the same time point when the reverse voltage is applied to the first rectifier FR1. Moreover, when the reverse voltage is applied to the first rectifier FR1, a transient current is generated.

Example of Operation of Rectifier Circuit 1

Figure 2:
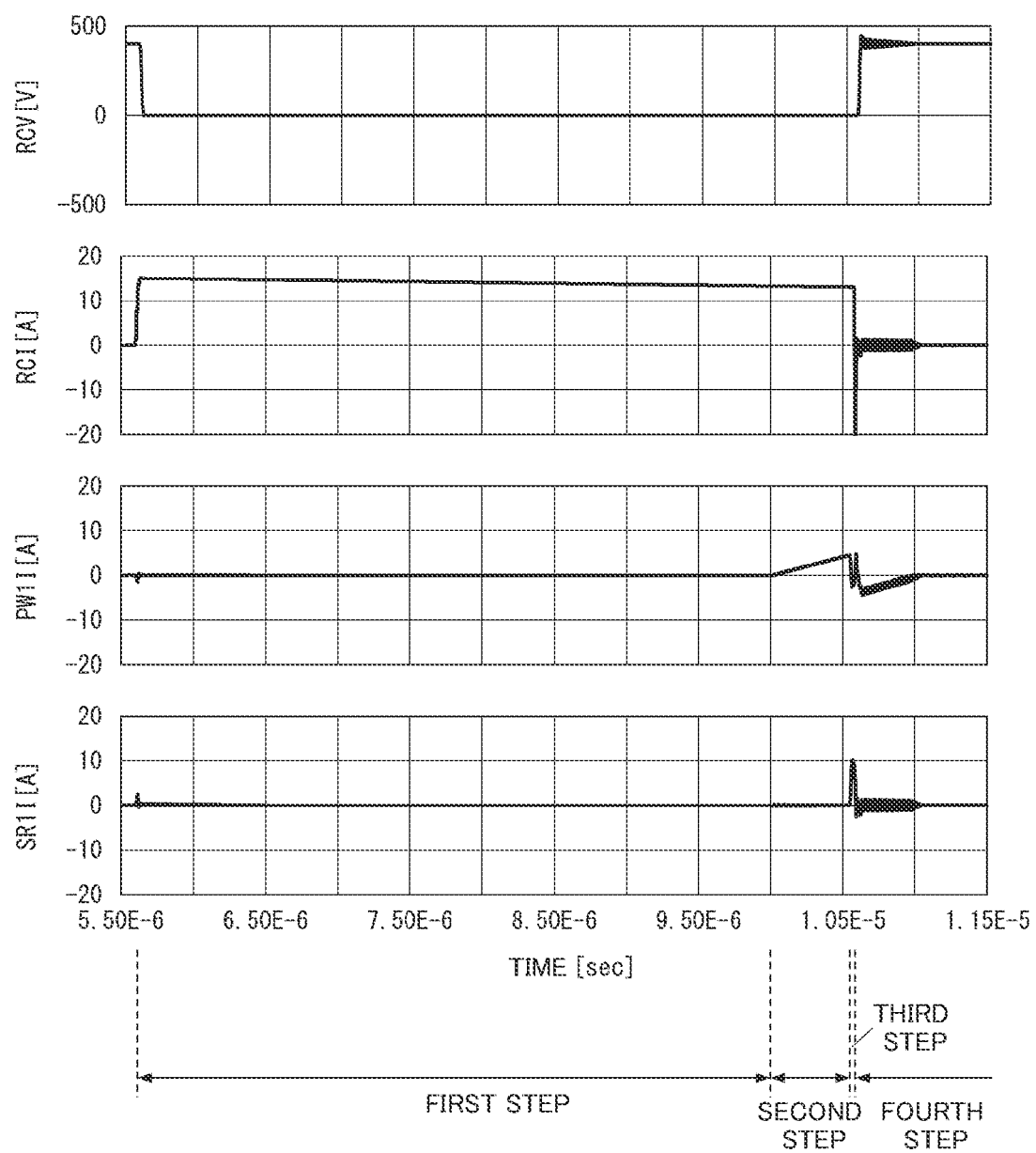
FIG. 2 is a set of diagrams of voltage and current waveforms.

Described below is an example of an operation of the rectifier circuit 1, with reference to FIGS. 2 to 4. FIG. 2 is a set of graphs illustrating voltage and current waveforms of the rectifier circuit 1. FIG. 2 illustrates four waveforms along a common time scale (a horizontal axis). Moreover, the horizontal axis shows time periods for a first step to a fourth step to be described below.

A voltage and currents illustrated in FIG. 2 include the following:

a rectifier circuit voltage (RCV) is applied to the first terminal FT1 with reference to the second terminal ST1;

a rectifier circuit current (RCI) flows from the second terminal ST1 to the first terminal FT1;

a primary winding current (PW1I) flows from the power supply TP1 to the primary winding PW1; and a second rectifier current (SR1I) flows through the second rectifier SR1 in a forward direction. On a vertical axis (As to values of the voltages or the current) of each graph in FIG. 2, a negative value denotes a value in the reverse direction of a value in the positive direction (or, the forward direction). Hence, a negative RCI is a transient current (a reverse current). In contrast, a positive RCI is a rectification current (a forward current).

Figure 3:
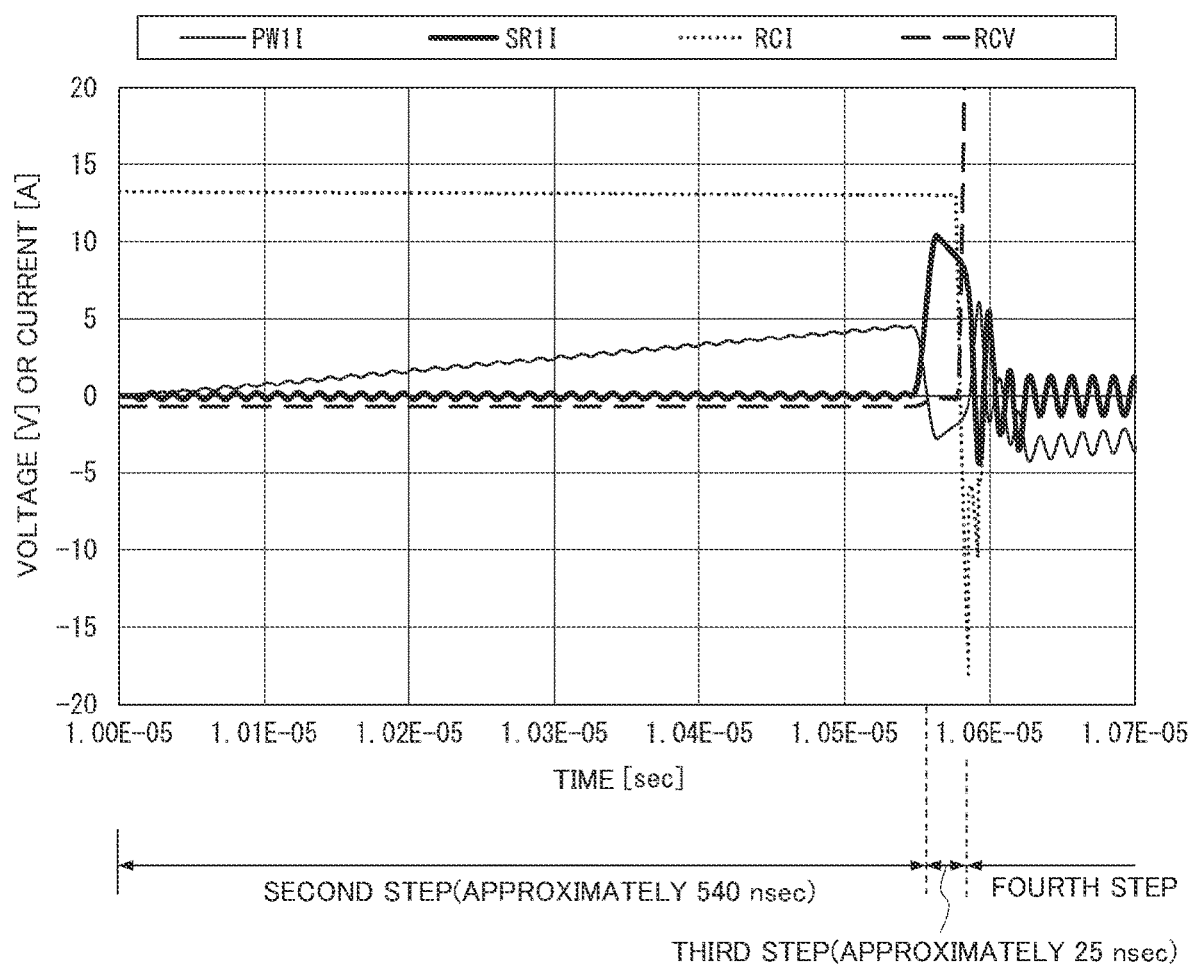
FIG. 3 is a diagram collectively showing the graphs in FIG. 2 on an enlarged scale.

FIG. 3 is a graph collectively showing the graphs in FIG. 2 on an enlarged scale. FIG. 3 illustrates each of the waveforms formed at around a time point when a second step, a third step, and a fourth step illustrated in FIG. 2 start. Unlike FIG. 2, FIG. 3 illustrates four waveforms in a single graph. For the sake of illustration on an enlarged scale, in FIG. 3, the RCV runs out of an upper end of the graph.

Figure 4:
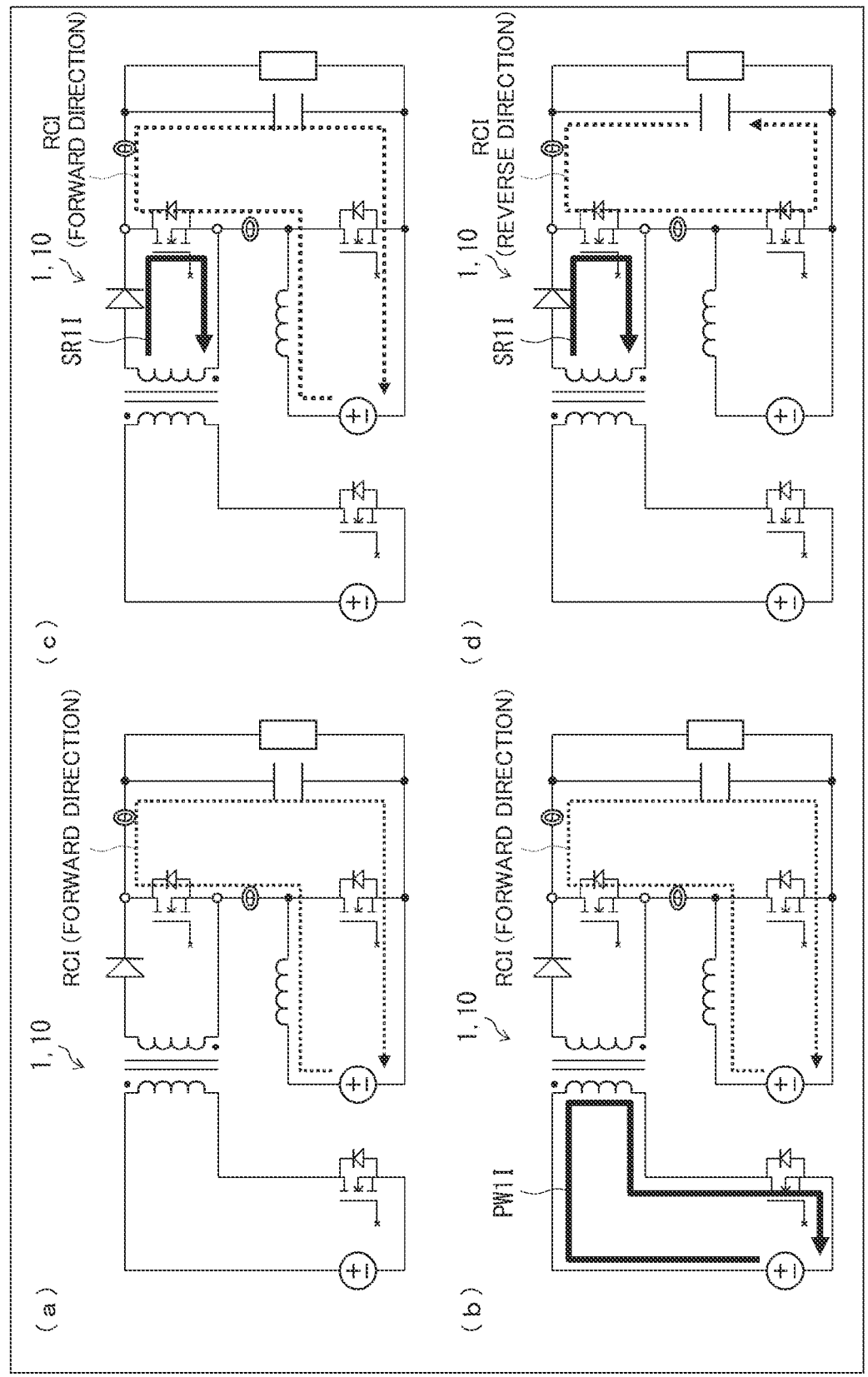
FIG. 4 is a set of diagrams (a) to (d) showing current paths in first to fourth steps.

FIG. 4 is a set of diagrams showing current paths in first to fourth steps. Specifically, the diagrams (a) to (d) in FIG. 4 illustrate respective current paths in the first to fourth steps. For the sake of illustration, FIG. 4 omits reference signs of the elements in FIG. 1 as appropriate. Moreover, compared with FIG. 1, FIG. 4 simplifies the illustration of each element.

A method for driving (controlling) the rectifier circuit 1 involves the following four steps to be carried out in the stated order:

- a first step involves applying a forward voltage to the rectifier circuit 1 (i.e., applying a positive voltage to the second terminal ST1 with reference to the first terminal FT1), so that a rectification current flows in the rectifier circuit 1;
- a second step involves turning the switch TT1 ON, so that a current flows in the primary winding PW1;
- a third step involves turning the switch TT1 OFF, so that a current flows in the second rectifier SR1; and
- a fourth step involves applying a reverse voltage to the rectifier circuit 1 (i.e., applying a positive voltage to the first terminal FT1 with reference to the second terminal ST1), and stopping (blocking) the rectification current.

The steps are specifically described below.

First Step

Before the first step, a current flows from the coil FC1 toward the switch element SST1. Hence, in the first step, the switch element SST1 turns OFF so that the coil FC1 generates electromotive force. By the electromotive force, a forward voltage of approximately 1 V can be applied to the rectifier circuit 1. As a result, a rectification current can flow in the rectifier circuit 1.

As illustrated in the diagram (a) of FIG. 4, the rectification current in the first step is an RCI in the forward direction. In the first step, the RCI flows through a path including the positive electrode of the power supply FP1, the coil FC1, the second terminal ST1, the first rectifier FR1, the first terminal FT1, the positive electrode of the capacitor RV1, the negative electrode of the capacitor RV1, and the negative electrode of the power supply FP1 in the stated order. This path of the RCI is common among the first to third steps.

The RCV illustrated in FIG. 2 is a voltage of the first terminal FT1 with reference to the second terminal ST1. Hence, a negative RCV is a forward voltage, and a positive RCV is a reverse voltage. As seen in the above example, the forward voltage is 1 V. Thus, in the first step, the RCV is approximately equal to −1 V. Note that, in FIG. 2, the vertical axis is illustrated in a large scale, and the illustration shows as if the RCV were approximately equal to 0 V. In contrast, FIG. 3 shows more clearly that the RCV is approximately equal to −1 V. The forward voltage allows a rectification current (a positive RCI) of approximately 14 A to flow in the first rectifier FR1.

For a safe operation, the first rectifier FR1 is set to have a deadtime of 50 nsec. After the deadtime, the first rectifier FR1 can perform synchronous rectification. Note that this synchronous rectification is not essential for the rectifier circuit 1. For example, if the rectifier circuit 1 does not have to perform synchronous rectification, a diode can be used as the first rectifier FR1.

Note that, in the first step, a current flowing in the second rectifier SR1 is sufficiently small. This is because the second rectifier SR1 is connected to the secondary winding SW1. That is, the second rectifier SR1 allows intervention by an inductance of the secondary winding SW1. Hence, unlike the diagrams (c) to (d) in FIG. 4, the diagram (a) in FIG. 4 omits an illustration of the SR1I.

Second Step

After the rectification current flows in the rectifier circuit 1 (subsequent to the first step), the switch element TT is turned ON. As an example, in 4.4 μsec after a forward current flows in the rectification current flows, the switch element TT is turned ON. When the switch element TT1 is turned ON, a current can flow in the primary winding PW1.

That is, the PW1I can be generated. As illustrated in the diagram (b) of FIG. 4, in the second step, the PW1I flows through a path including the positive electrode of the power supply TP1, the primary winding PW1, the switch element TT1, and the negative electrode of the power supply TP1 in the stated order.

In the second step, the PW1I increases substantially linearly as time passes. A speed of the increase in the PW1I mainly depends on a voltage of the power supply TP1 (e.g., 15 V) and an inductance of the primary winding PW1 (e.g., 1.6 pH). Moreover, the speed of the increase in the PW1I is also affected by a voltage drop due to parasitic resistance (e.g., an ON resistance of the switch element TT1, and a resistance of the primary winding PW1). As illustrated in FIG. 3, in this example, the switch element is kept ON for approximately 540 nsec to increase the PW1I to approximately 5 A.

Third Step

Subsequent to the second step, the switch element TT1 is turned OFF. That is, the switch element TT1 is switched from ON to OFF. When the switch element TT1 is turned OFF, the SR1I can be generated. As illustrated in the diagram (c) of FIG. 4, in the third step, the SR1I flows through a path including the negative electrode of the secondary winding SW1 (with no black dot), the second rectifier SR1, the first rectifier FR1, the positive electrode of the secondary winding SW1 (with a black dot) in the stated order.

The path through which the SR1I flows may be described from a different point of view. Here, an attention is paid in particular to the first rectifier FR1 in the diagram (c) of FIG. 4, and described below is a current flowing in the first rectifier FR1. The diagram (c) of FIG. 4 illustrates the RCI; namely, the rectification current (flowing upward in the position of the first rectifier FR1 in the diagram), and the SR1I; namely, the second rectifier current (flowing downward in the position of the first rectifier FR1 in the diagram). When these currents flow in opposite directions through the same path at the same time point, a difference is created between values of the two currents (current values) in the path. In the example of the diagram (c) in the FIG. 4, the current value of the DR1I is smaller than that of the RCI. Hence, the SR1I is cancelled out by the rectification current RCI. In other words, the RCI is partially commutated to the path of the SR1I.

When the switch element TT1 is turned OFF, the path of the PW1I is blocked. That is, the PW1I falls approximately to 0 A. As a result, generated in the secondary winding SW1 is electromotive force in the reverse direction of the previous current (i.e., reverse electromotive force). This is because the secondary winding SW1 is magnetically connected to the primary winding PW1. Because of the reverse electromotive force, a forward voltage is applied to, and thus the SR1I flows in, the second rectifier SR1. Hence, the SR1I may also be referred to as an excitation current in the secondary winding SW1.

Even if the switch element TT1 is turned OFF, the SR1I to be generated cannot instantaneously be large because of the inductances of the constituent features. Hence, a certain time period is required for the SR1I to sufficiently increase to a large value. As illustrated in FIG. 3, in approximately 25 nsec after the switch element TT1 turns OFF, the SR1I increases to approximately 9 A.

Fourth Step

Subsequent to the third step, a reverse voltage is applied to the rectifier circuit 1. In the fourth step, the reverse voltage can be applied when the switch element SST1 is turned ON. Upon the application of the reverse voltage, a transient current is generated.

As illustrated in the diagram (d) of FIG. 4, the RCI in the reverse direction is generated as a main component of the transient current. In the fourth step, the RCI flows through a path including the positive electrode of the capacitor RV1, the first terminal FT1, the first rectifier FR1, the second terminal ST1, the switch element SST1, and the negative electrode of the capacitor RV1 in the stated order.

In the fourth step, however, the rectifier circuit 1 further conducts another current than the RCI in the reverse direction. Specifically, in the fourth step, the rectifier circuit 1 conducts the SR1I generated in the third step such that the SR1I flows through the first rectifier FR1 (see the diagram (d) of FIG. 4).

Hence in the fourth step, the transient current flowing in the first rectifier FR1 can be canceled out for the SR1I. Accordingly, the transient current can be effectively reduced over conventional techniques. Most of the transient current causes loss in the switch element SST1. Accordingly, this loss can also be effectively reduced over conventional techniques.

Although not shown in the diagram (d) of FIG. 4, when the fourth step starts, another current flows through a path including the positive electrode of the power supply FP1, the coil FC1, the switch element SST1, and the negative electrode of the power supply FP1 in the stated order. This current is similar to that flowing in the typical power supply circuit.

Additional Comments on Connection of Transformer TR1

As to be described later, the transformer TR1 is provided as a member to store the magnetic energy in the second step. Hence, in a period for the PW1I to flow (a conduction period of the primary winding PW1), the secondary winding SW1 needs to be kept from conducting a current (i.e., the SR1I is kept from being generated). Hence, the PW1I and the SR1I are not simultaneously generated. Note that a current not intended by a designer of the rectifier circuit 1, such as a current due to parasitic capacitance, is excluded.

When a positive voltage is applied to the positive electrode of the primary winding PW1 (i.e., the black dot of the primary winding PW1, a positive voltage is generated on the positive electrode of the secondary winding SW1 (i.e., the black dot of the secondary winding SW1). The voltage is applied to the secondary winding SW1 from the positive electrode (with the black dot) toward the negative electrode (without the black dot). Note that, in the rectifier circuit 1, the second rectifier SR1 is interposed between the positive electrode (with the black dot) and the negative electrode (without the black dot) of the secondary winding SW1. Hence, also when a voltage is applied to the primary winding PW1 to generate the PW1I, the SR1I is not generated. Such a feature allows the magnetic energy due to the PW1I to be stored in the primary winding PW1.

In the third step, the PW1I is blocked so that the magnetic energy stored in the primary winding PW1 generates reverse electromotive force in the secondary winding SW1. That is, the polarity of a voltage to be applied to the secondary winding SW1 is reversed. As a result, the second rectifier SR1, which has received a reverse voltage, now receives a forward voltage. Such a feature makes it possible to generate the SR1I under the condition in which the PW1 is blocked. Hence, in the rectifier circuit according to an aspect of the present disclosure, a transformer is connected in a manner not to simultaneously generate the PW1I and the SR1I.

Figure 5:
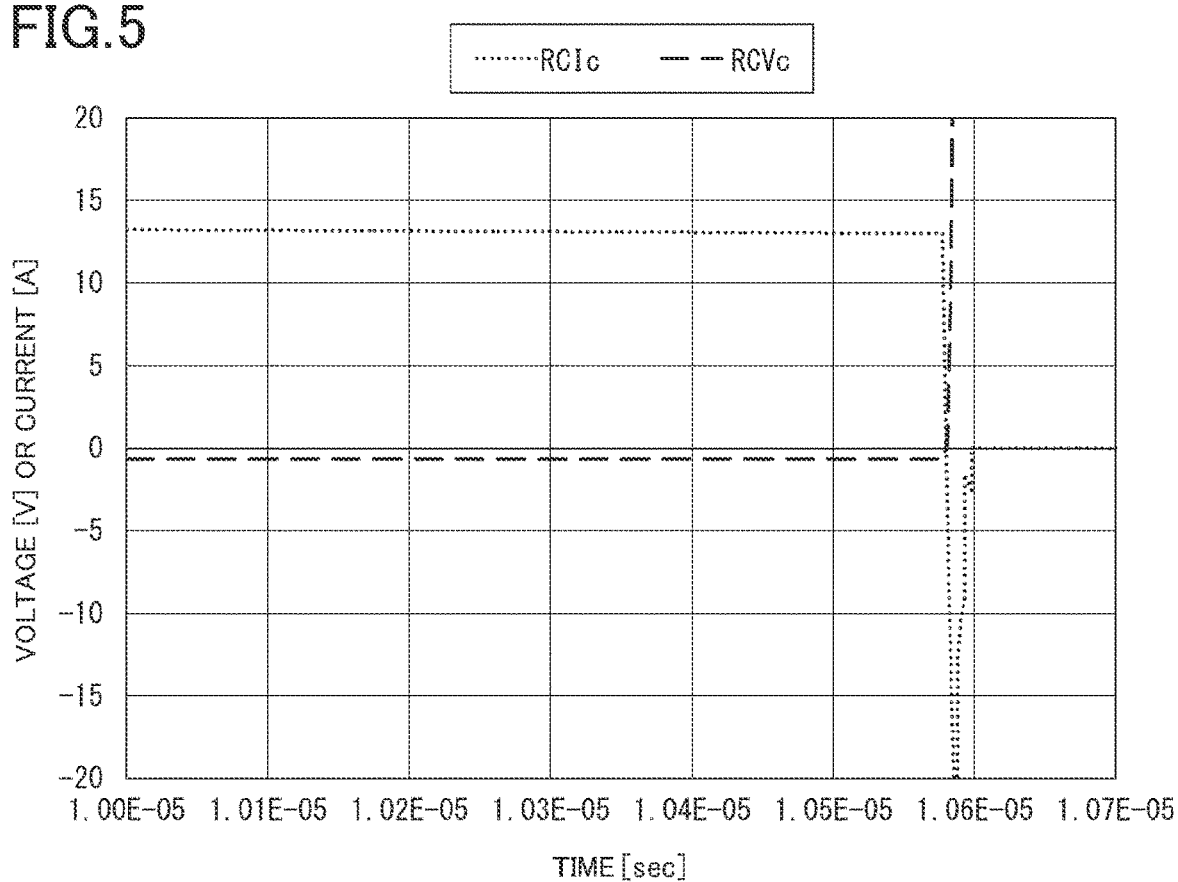
FIG. 5 is a diagram of voltage and current waveforms of a rectifier circuit in a power supply circuit according to a comparative example.
Figure 7:
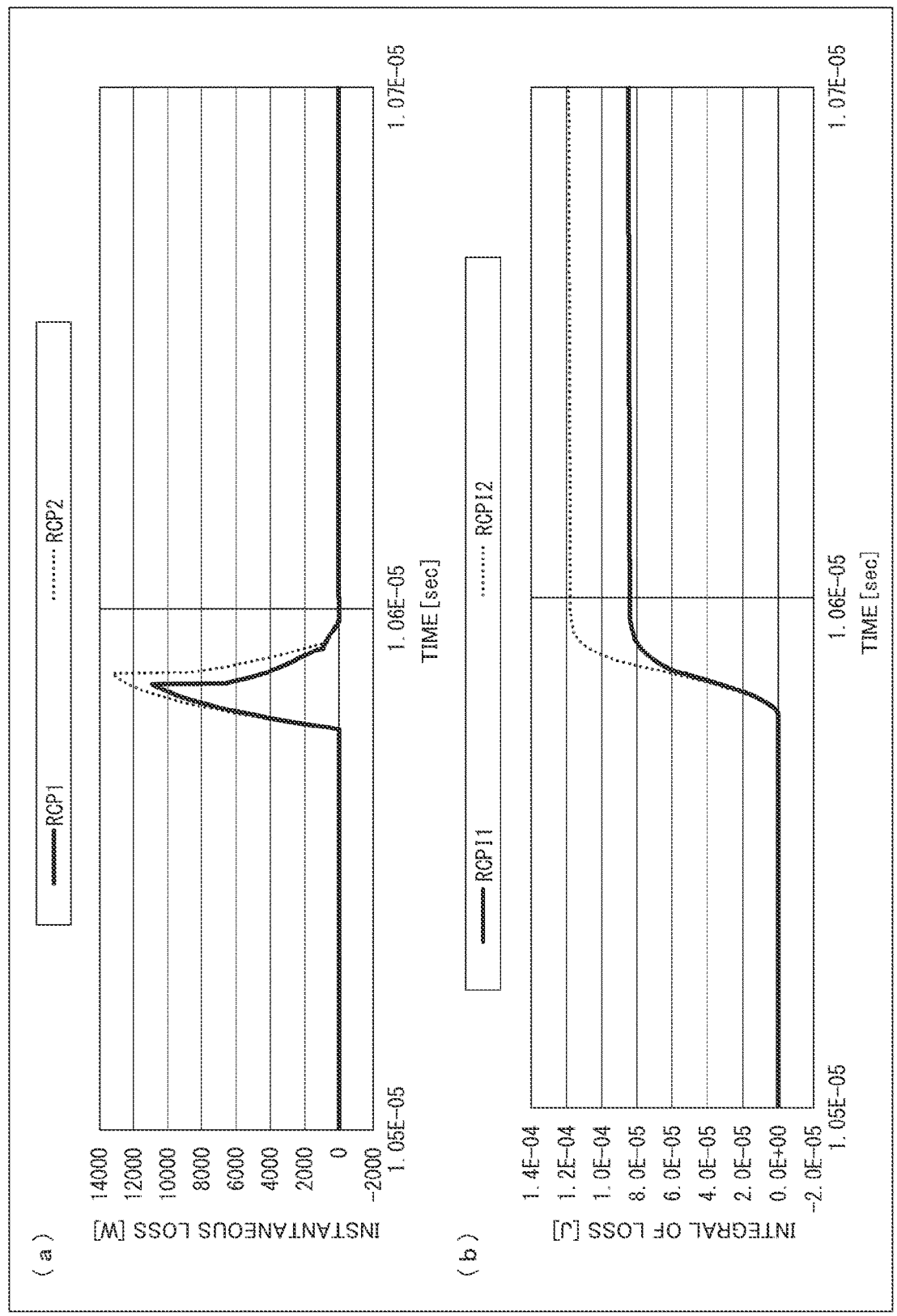
FIG. 7 is a set of diagrams in which a diagram (a) shows a comparison between instantaneous losses in the first embodiment and the comparative example, and a diagram (b) shows a comparison between integrals of loss between the first embodiment and the comparative example.

Effects of Reducing Transient Current, Principle of Reducing Transient Current, and Effects of Reducing Loss In addition to FIGS. 3 and 4, with further reference to FIGS. 5 and 7, "effects of reducing transient current", "principles of reducing transient current", and "effects of reducing loss" in the rectifier circuit 1 are described in the stated order.

Figure 6:
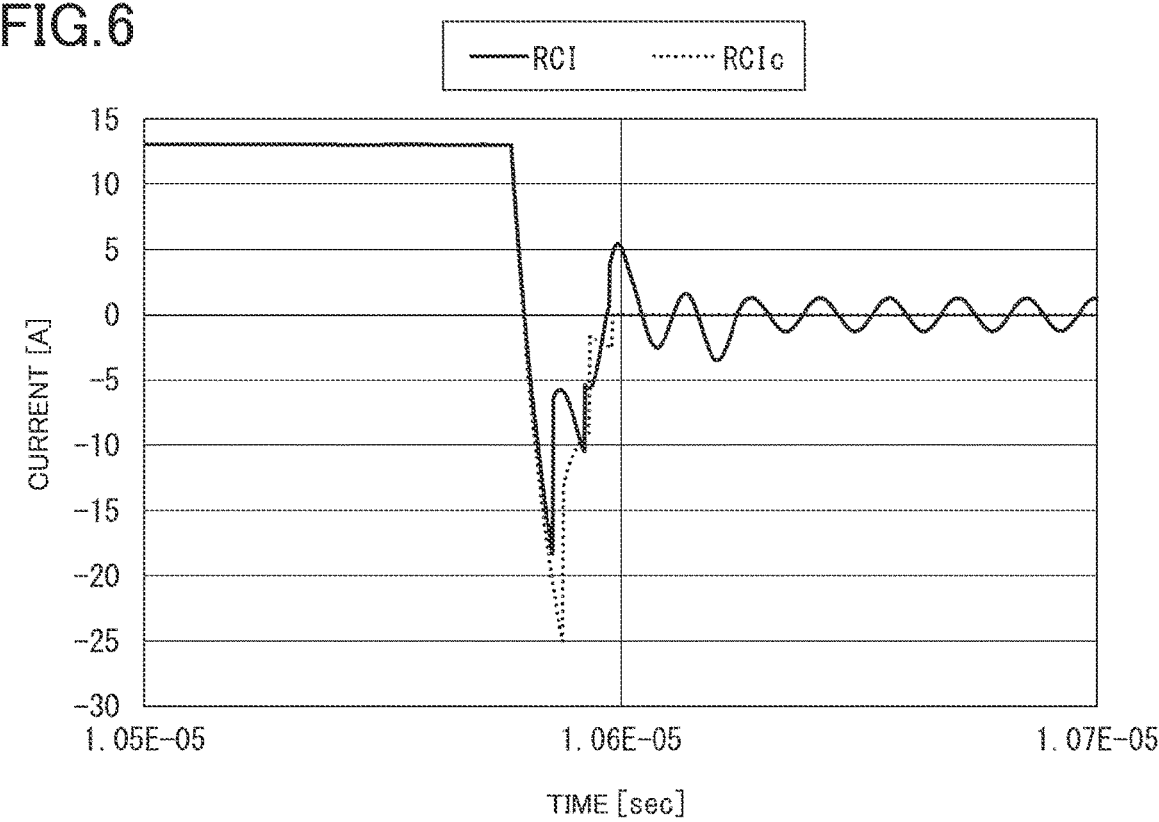
FIG. 6 is a diagram showing a comparison between the currents of the rectifier circuits in the first embodiment and the comparative example.

FIG. 5 is a graph illustrating waveforms of a rectifier circuit voltage (RFVc) and a rectifier circuit current (RFIc) in the power supply circuit 10r (the comparative example). The horizontal and vertical axes of the graph in FIG. 5 have the same scale as those in the graph in FIG. 3. FIG. 6 is a diagram showing a comparison between the RCI (a rectifier circuit current in the power supply circuit 10) in FIG. 3 and the RCIc in FIG. 5. In FIG. 6, the waveforms of the RCI and RCIc are illustrated in the same graph.

FIG. 7 is a set of graphs each showing a comparison between losses caused by transient current in the power supply circuit 10 and the power supply circuit 10r. A graph (a) illustrates an instantaneous loss (hereinafter RCP1) of the power supply circuit 10 and an instantaneous loss (hereinafter RCP2) of the power supply circuit 10r at each of time points. The instantaneous loss is caused by the transient current in the switch element SST1. In the graph (a) of FIG. 7, a unit of the vertical axis is W.

A graph (b) illustrates an integral of loss (hereinafter RCPI1) of the power supply circuit 10 and an integral of loss (hereinafter RCPI2) of the power supply circuit 10r at each of time points. The RCPI1 is obtained by integrating the RCP1 with respect to time. In a similar manner, the RCPI2 is obtained by integrating the RCP2 with respect to time. In the graph (b) of FIG. 7, a unit of the vertical axis is J.

1. Effects of Reducing Transient Current

Described here with reference to FIG. 5 is a transient current in the power supply circuit 10r. The power supply circuit 10r conducts a negative RCIc when a reverse voltage (a positive RCVc) is applied to the first rectifier FR1 (see at around a time 1.06E−5). The negative RCIc is a transient current to flow in a rectifier circuit (the first rectifier FR1) of the power supply circuit 10r. The amount of the transient current depends on the level of a voltage to be applied to the first rectifier FR1.

Because of the scale limitation of the vertical axis, the illustration of a voltage exceeding 20 V is omitted. Note, however, that, in this example, a voltage of 400 V (a voltage across the terminals of the capacitor RV1) is applied to the first rectifier FR 1. In accordance with this voltage of 400 V, a transient current greater than 20 A is generated in the power supply circuit 10r.

In contrast, described below with reference to FIG. 3 is a transient current of the power supply circuit 10 (the rectifier circuit 1). In the rectifier circuit 1, like the power supply circuit 10r, a voltage of 400 V is applied to the first rectifier FR1. However, in the rectifier circuit 1, the transient current (RCI) does not exceed 19 A at largest. As can be seen, the reduction of the transient current by the rectifier circuit 1 is confirmed.

FIG. 6 shows more clearly the difference in amount between the RCIc and RCI. As illustrated in FIG. 6, the largest value of the RCIc is approximately 25 A. In contrast, the largest value of the RCIc is approximately 18 A. As can be seen, compared with the typical technique, the rectifier circuit 1 can reduce the transient current by approximately 7 A.

2. Principles of Reducing Transient Current

Described next is a principle why the rectifier circuit 1 can reduce the transient current. When the switch element SST1 is turned ON, the voltage (400 V) across the terminals of the capacitor RV1 is applied to the rectifier (a rectifier circuit) as a reverse voltage. When the reverse voltage is applied, a transient current is generated. The reverse voltage is a source of energy to generate the transient current.

Specifically, when the reverse voltage stores a parasitic capacitance, an inrush current is generated. This inrush current is the transient current. The level of the voltage across the terminals of the capacitor RV1 (i.e., the level of the reverse voltage) is determined by the specifications of a power supply circuit. Hence, the rectifier circuit needs to be designed to correspond to the level of the reverse voltage.

The inventor has come up with a novel idea that the magnetic energy stored in the transformer TR1 is used to reduce the transient current. Specifically, in the rectifier circuit 1, the magnetic energy is released toward the second rectifier SR1 as a current (the SR1I), making it possible to generate a new charge current different from a charge current due to the voltage across the terminals of the capacitor RV1. The new charge current derives from the magnetic energy, and thus causes no inrush current.

In the second step (see the diagram (b) of FIG. 4), the switch element TT1 is turned ON, so that the magnetic energy can be stored in the transformer TR1. Next, in the third step (see the diagram (c) of FIG. 4), the switch element TT1 is turned OFF, so that the magnetic energy stored in the transformer TR1 can be released through the secondary winding SW1 as a forward current of the second rectifier SR1 (i.e., the SR1I).

After that, in the fourth step (see the diagram (d) of FIG. 4), the switch element SST1 is turned ON while the SR1I is flowing. As a result, as can be seen, the drain voltage of the switch element SST1 falls, and the voltage of the first terminal FT1 with respect to the second terminal ST1 rises. Hence, a reverse voltage is applied to the rectifier circuit 1, generating a transient current (the RCI). At this moment, as described above, the flowing SR1I can reduce the transient current.

When observed from the first rectifier FR1, the RCI and the SR1I flow in the same direction. When the parasitic capacitance of the first rectifier FR1 is stored, the charge current to flow is sufficient in necessary amount for the storing of the parasitic capacitance. The charge current may be either a current (the RCI) to be supplied from the capacitor RV1, or a current (the SR1I) to be supplied from the second rectifier SR1. This is because the storing ends when the parasitic capacitance is supplied with a sufficient amount of current for the storing. This idea also applies to the case of a reverse recovery current.

The inventor has paid attention to this point, and come to the idea to reduce the transient current by the flowing SR1I. The configuration of the rectifier circuit 1 is created on the basis of the idea. The rectifier circuit 1 can reduce the transient current.

3. Effects of Reducing Loss Described next is a relationship between a transient current and a loss. When the switch element SST1 is turned ON, the switch element SST1 transits, as time passes, from an OFF state (i.e., a high resistance state; ideally, a state of ∞Ω) to an ON state (i.e., a low resistance state; ideally, a state of 0Ω). When the transient current flows in a period before the resistance of the switch SST1 sufficiently decreases, the loss increases. Hence, when the transient current flowing in the switch element SST1 decreases, the loss can be efficiently reduced.

As illustrated in the diagram (a) of FIG. 7, the RCP1 is confirmed to be smaller than the RCP2. Hence, in the rectifier circuit 1, when the transient current decreases, the loss can be efficiently reduced. Moreover, as illustrated in the diagram (b) of FIG. 7, the RCP1I has a steady-state value of approximately 8E−5 J. In contrast, the RCPI2 has a steady-state value of approximately 1.2E−4 J. Hence, in the rectifier circuit 1, the energy loss can be reduced by approximately 30%.

Figure 8:
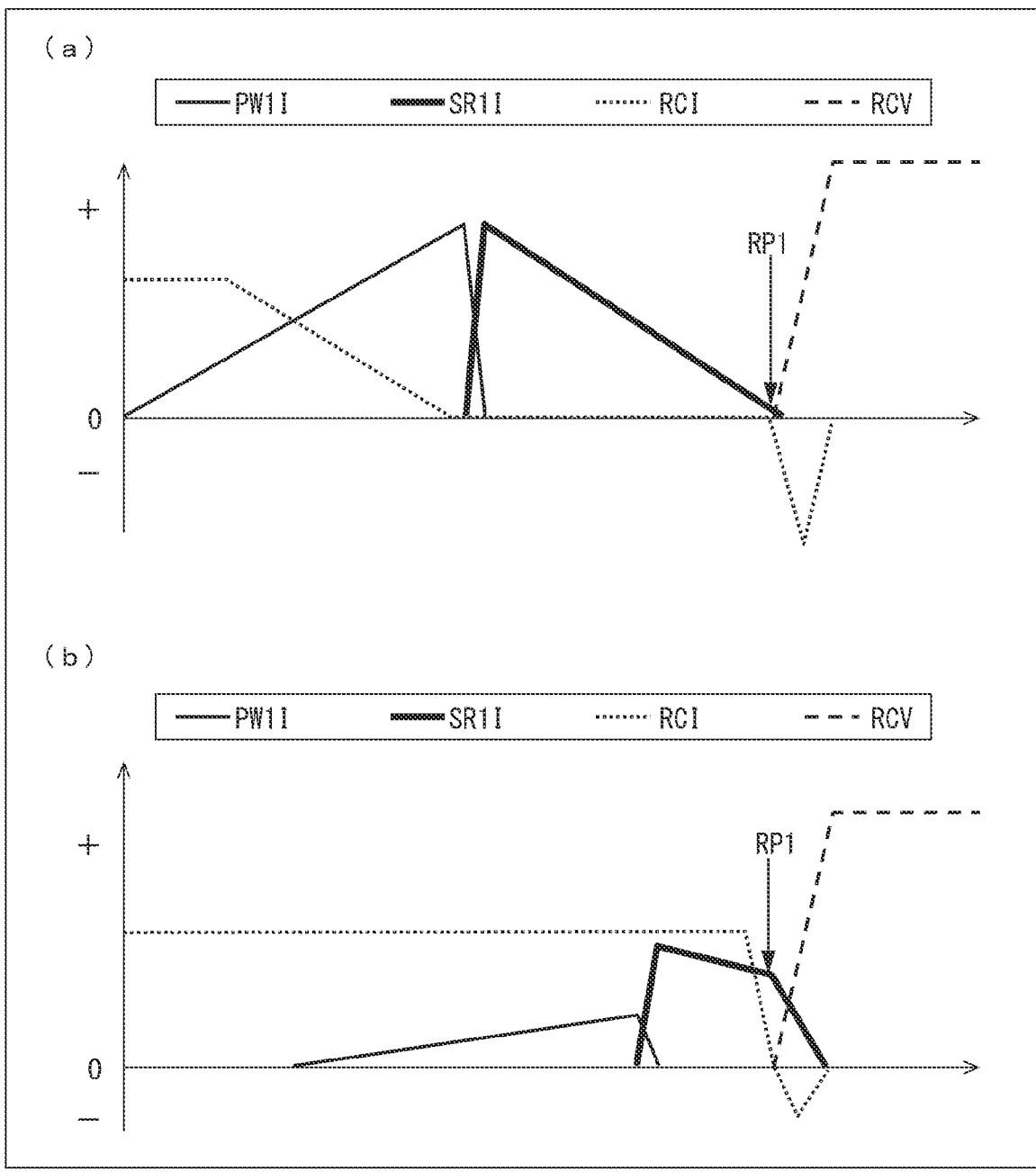
FIG. 8 is a set of diagrams in which a diagram (a) shows for a reference purpose an inappropriate operation of the rectifier circuit according to the first embodiment, and a diagram (b) shows improvements in the rectifier circuit.
Figure 9:
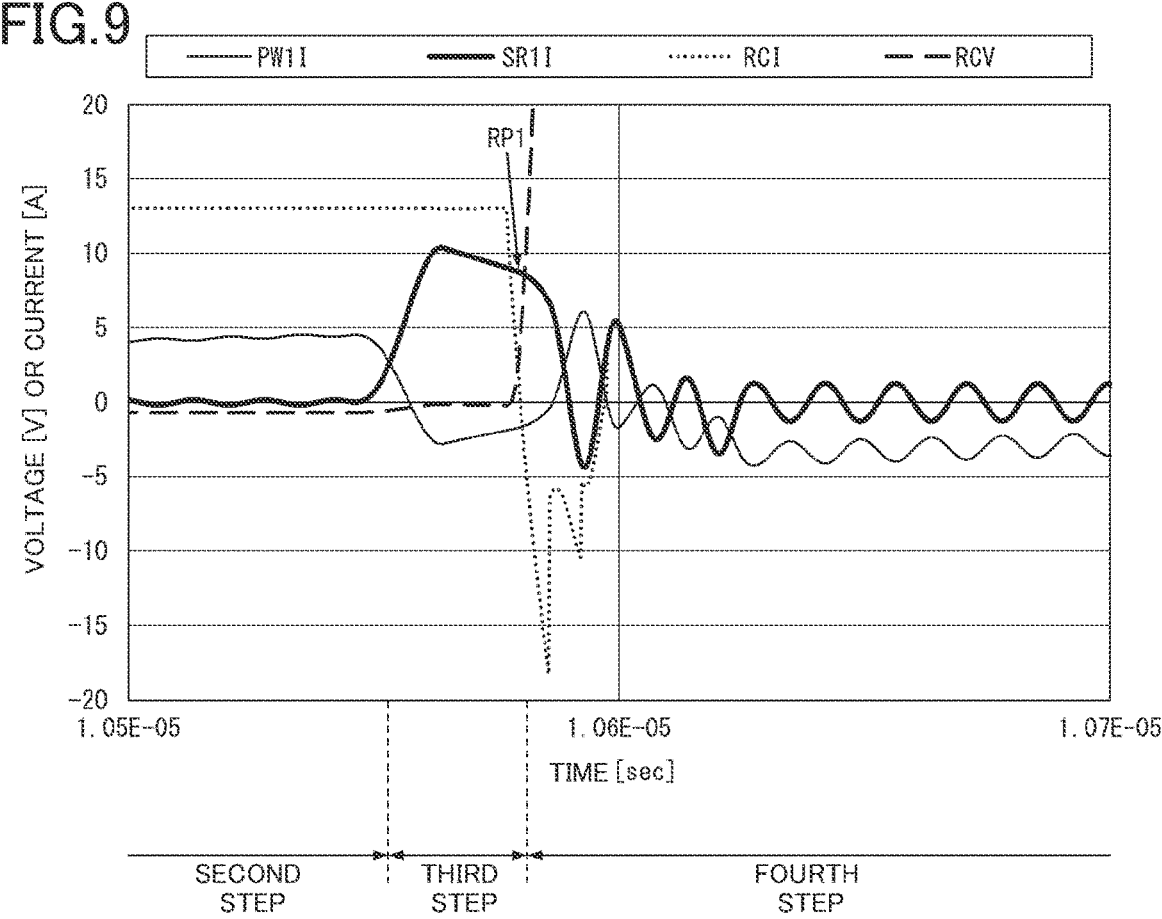
FIG. 9 is a diagram of waveforms in an actual operation of the rectifier circuit, according to the first embodiment, with the improvements in the diagram (b) in FIG. 8 achieved.

How to Reduce Current Value and Conductive Period of Second Rectifier SR1, and Attenuation of Current Described next with reference to FIGS. 8 and 9 are an appropriate current value and conductive period of a current (the SR1I) to flow in the second rectifier SR1. Additionally described is how to reduce attenuation of the SR1I.

FIG. 8 shows graphs schematically illustrating waveforms of the above PW1I, SR1I, RCI, and RCV. In the graphs, the horizontal axis indicates a time scale, and the vertical axis indicates a voltage or a current. On the vertical axis, 0 denotes the zero level of the voltage or the current. The graphs in FIG. 8 illustrate the waveforms in and around the time period from the second to third steps. The graphs in FIG. 8 are schematic graphs for illustrative purposes, and detailed values are omitted.

The diagram (a) of FIG. 8 illustrates for reference purposes an inappropriate operation of the rectifier circuit 1. The diagram (a) of FIG. 8 collectively shows inappropriate factors in a single diagram. Note that the diagram (a) of FIG. 8 is used for illustrative purposes to explain the diagram (b) of FIG. 8. The diagram (b) of FIG. 8 illustrates appropriate operations of (improvements in) the rectifier circuit 1.

FIG. 9 is a graph of data (waveforms) in an actual operation of the rectifier circuit 1 with the improvements in the diagram (b) of FIG. 8 achieved. FIG. 9 shows on a larger scale the third step and time periods before and after the third step illustrated in FIG. 3. Other than that, FIG. 9 is the same as FIG. 3.

1. Appropriate Value of Current SR1I.

The example of the diagram (a) in FIG. 8 shows that the SR1I at a predetermined time point (a certain time point) is larger than the RCI at the same time point. A flow of the SR1I larger than the RCI is a flow of unnecessary current throughout the rectifier circuit 1. As a result, the unnecessary current increases loss.

Hence, in the rectifier circuit 1, (the amount of) the SR1I at a predetermined time point is preferably smaller than or equal to (the amount of) the RCI (hereinafter a first improvement). The example in the diagram (b) of FIG. 8 is different from that in the diagram (a) of FIG. 8 in that the SR1I is set to satisfy the first improvement. Such a feature can prevent generation of the unnecessary current, making it possible to also prevent an increase in the loss.

Note that, for example, in the case where a significantly large transient current is generated in the first rectifier FR1 because of the circuitry, (the amount of) the SR1I at a predetermined time point can be larger than, or equal to, (the amount of) the RCI at the same time point. Hence, (the amount of) the SR1I is preferably adjusted appropriately, depending on the case.

2. Appropriate Conductive Period of Current SR1I.

When the SR1I flows in a period other than that in which a transient current (the RCI) flows, the SR1I ends up causing loss because of a conductive loss. Moreover, when the conductive loss causes a decrease in the SR1I, the SR1I cannot be supplied in sufficient amount in the period in which the RCI flows. Such a problem reduces an effect of reducing RCI by the SR1I.

Meanwhile, a period for the PW1I to flow (the conductive period of the primary winding PW1) is to store energy (magnetic energy) in the primary winding PW1. If the period is excessively short, it is difficult to store a sufficient amount of the energy in the primary winding PW1. For the rectifier circuit 1, the period is preferably set to approximately 100 nsec or longer.

In contrast, a period for the SR1I to flow (the conductive period of the second rectifier SR1) is to release the stored energy. That is, the conductive period of the second rectifier SR1 is to release the stored energy, and does not have to be long. In other words, the conductive period of the second rectifier SR1 is preferably short for reducing the conductive loss. Note, however, that if the conductive period of the second rectifier SR1 is shorter than 10 nsec, it is difficult to appropriately adjust a time point to apply a reverse voltage to the rectifier circuit 1. That is, if the conductive period of the second rectifier SR1 is shorter than 10 nsec, the conductive period is excessively short. This is the matter to which attention needs to be paid. As can be seen, preferably, it should be noted that the conductive period of the second rectifier SR1 is set not to be shorter than 10 nsec, as well as set to be sufficiently shorter than that of the primary winding PW1.

In the example of the diagram (a) of FIG. 8, the conductive period of the second rectifier SR1 is set substantially as long as that of the primary winding PW1. In this case, the loss by the SR1I is great. Moreover, the SR1I is significantly small at a time point (hereinafter an RP1) when a transient current (the RCI) flows. Because of this problem, the transient current (RCI) cannot be sufficiently reduced.

In contrast, in the example of the diagram (b) of FIG. 8, the conductive period of the second rectifier SR1 is set shorter than that of the primary winding PW1. Such a feature makes it possible to reduce loss caused by the SR1I. Moreover, compared with the case of the diagram (a) in FIG. 8, the feature makes it possible to increase the SR1I. Hence, the transient current (RCI) can be sufficiently reduced.

More specifically, in the rectifier circuit 1, (the length of) the conductive period of the second rectifier SR1 is preferably as long as, or shorter than, half (the length of) the conductive period of the primary winding PW1 (hereinafter a second improvement). The example in the diagram (b) of FIG. 8 is different from that in the diagram (a) of FIG. 8 in that the conductive period of the SR1 is set to satisfy the second improvement. More specifically, the conductive period of the second rectifier SR1 is a part of a period in which the switch element TT1 is OFF (i.e., the period of the third step). Furthermore, the conductive period of the primary winding PW1 substantially corresponds to a period in which the switch element TT1 is ON (i.e., the period of the second step).

More preferably, the conductive period of the second rectifier SR1 is approximately as long as, or shorter than, one tenth the conductive period of the primary winding PW1. In this example, the conductive period of the primary winding PW1 is approximately 540 nsec, and the conductive period of the second rectifier SR1 is approximately 25 nsec. In this case, the conductive period of the second rectifier SR1 is approximately one twentieth as long as the conductive period of the primary winding PW1.

3. How to Reduce Attenuation of SR1I.

In the conductive period of the second rectifier SR1, loss is caused by, for example, (i) a resistance of the secondary winding SW1 and (ii) a voltage drop (approximately 1 V) when the second rectifier SR1 conducts a current. Such loss (attenuation) of energy could attenuate the SR1I as time passes. Two techniques below can be applied as how to reduce attenuation of the SR1I.

First Technique: An Approach to the Time Point when the Second Rectifier SR1 Starts to Conduct Electricity.

When a rectification current (a positive RCI) flows in the first rectifier FR1, and the voltage of the rectifier FR1 drops, the voltage of the first terminal FT1 falls below the voltage of the second terminal ST1 by approximately 1 V. That is, with reference to the first terminal FT1, the voltage of the second terminal ST1 rises by approximately 1 V.

When the SR1I flows in this situation, the SR1I runs from the second terminal ST1 (a higher voltage) to the first terminal FT1 (a lower voltage). Hence, the voltage drop (approximately 1 V) of the second rectifier SR1 is cancelled out by the voltage rise (approximately 1 V) of the second terminal ST1. Such a feature reduces the attenuation of energy, making it possible to reduce the attenuation of the SR1I. Hence, the SR1I can sufficiently reduce the RCI.

In the example of the diagram (a) in FIG. 8, the SR1I starts to flow after the period in which the rectification current (a positive RCI) flows. In this case, after reaching a peak, the SR1I is rapidly attenuated as time passes.

Hence, in the rectifier circuit 1, the SR1I preferably starts to flow in the period in which the rectification current (a positive RCI) is flowing (hereinafter a third improvement). The example in the diagram (b) of FIG. 8 is different from that in the diagram (a) of FIG. 8 in that the time point when the SR1I starts to flow (i.e., the time point when the second rectifier SR1 starts to conduct a current) is set to satisfy the third improvement. The time point when the second rectifier SR1 starts to conduct a current corresponds to the time point when the switch element TT1 is switched from ON to OFF (i.e., the time point when the third step starts).

The third improvement can reduce the attenuation of the SR1I, as seen above. A comparison between the example of the diagram (a) in FIG. 8 and the example of the diagram (b) in FIG. 8 shows that the SR1I in the latter example is gradually attenuated as time passes. Hence, the transient current (a negative RCI) in the latter example can be sufficiently reduced compared with that in the former example.

Second Technique: An Approach to Inductance of the Secondary Winding SW1

The attenuation of the SR1I can also be reduced when an inductance (hereinafter L) of the secondary winding SW1 is increased. Note, however, that an excessively high L inevitably causes an increase in the size of the transformer TR1. In order to reduce the risk of the size increase, it is not preferable to make the L excessively high. For example, if the L is 1 mH or higher, the transformer TR1 could be larger in size.

Considered here as an example is a case where an attenuation of the SR1I is set to 1 A or below. Moreover, in this case, a conduction period and a voltage drop of the second rectifier SR1 are respectively set to 50 nsec and 1 V. Here, in the expression $V=L\times(di/dt)\approx L\times(\Delta i/\Delta t)$, 1 A may be substituted for $\Delta i$, 50 nsec may be substituted for $\Delta t$, and 1 V may be substituted for V. As a result, the L is calculated to be 50 nH. Hence, the L in this example is preferably 50 nH or higher. As an example, the L in the rectifier circuit 1 is 700 nH.

Here, a path from the first terminal FT1 through the first rectifier FR1 to the second terminal ST1 is referred to as a specific path. If an inductance (hereinafter an Lt) of the specific path is high, noise is likely to develop when a transient current flows. Hence, the Lt is preferably low. However, when a parasitic inductance of the first rectifier FR1 is taken into consideration, it is difficult to make the Lt excessively low. For example, it is difficult to reduce the Lt to 5 nH or lower. As an example, the Lt in the rectifier circuit 1 is 30 nH.

Given the above consideration, the L is preferably higher than the Lt to some extent. As an example, in the rectifier circuit 1, the L is preferably twice as high as, or higher than, the Lt (hereinafter a fourth improvement). Furthermore, the L is more preferably ten times as high as, or higher than, the Lt. In this example, the L is 700 nH and the Lt is 30 nH. Hence, the L is sufficiently ten times higher than the Lt.

The L is set to satisfy the fourth improvement, making it possible to reduce the attenuation of the SR1I. For example, the SR1I at the RP1 can be sufficiently made larger in the example of the diagram (b) in FIG. 8 than in the example of the diagram (a) in FIG. 8. Such a feature can sufficiently reduce the transient current.

How to Reduce PW1I.

As can be seen, the conductive period of the primary winding PW1 is sufficiently longer than that of the second rectifier SR1. Hence, in order to reduce the loss of the primary winding PW1, the PW1I is preferably reduced.

As an example, the PW1I can be reduced when a corresponding relationship (i.e., a ratio of turns in the transformer TR1) is appropriately set between the number of turns (N1) in the primary winding PW1 and the number of turns (N2) in the secondary winding SW1. Specifically, in the rectifier circuit 1, the N1 is preferably larger than the N2 (hereinafter a fifth improvement). In the above example, the N1 is nine and the N2 is six, and the fifth improvement is satisfied.

When the N2 is constant and the N1 is increased, the PW1I can be reduced. This is because, when a relationship between the turns and the flux linkage is taken into consideration, a relationship of N1×PW1I=N2×SR1I holds. Thanks to this relationship, the PW1I can be decreased with an increase in the N1.

However, if a voltage of the secondary winding SW1 (i.e., a secondary voltage of the transformer TR1) is constant when the N1 is increased, a voltage of the primary winding PW1 (i.e., a primary voltage of the transformer TR1) increases with the increase in the N1. Hence, in order to keep the switch element TT1 from breaking down, it is not preferable to excessively increase the N1.

Thus, taking the switch element TT1, which is currently on sale (e.g., a transistor), into consideration, the N1 is preferably as large as, or smaller than, three times the N2. Moreover, taking reduction in costs of the rectifier circuit 1 into consideration, the N1 is more preferably as large as, or smaller than, twice the N2.

In the example of the diagram (a) in FIG. 8, the N1 is equal to the N2. In contrast, in the example of the diagram (b) in FIG. 8, the N1 is set to satisfy the fifth improvement. Hence, a comparison between the example of the diagram (a) in FIG. 8 and the example of the diagram (b) shows that the PW1I in the latter example is sufficiently reduced. As a result, the loss of the primary winding PW1 can be reduced. In addition, the loss of the switch device TT1 can also be reduced.

Advantageous Effects of Improvements 1 to 5

The rectifier circuit 1 is designed to satisfy all the improvements 1 to 5. Advantageous effects of the improvements are described below, with reference to FIG. 9. FIG. 9 corresponds to the diagram (b) of FIG. 8. FIG. 9 illustrates the RP1 (a time point when the RCI is generated as a transient current) corresponding to the RP1 in FIG. 8. In the example of FIG. 9, ringing affected by, for example, parasitic capacitance is observed on each of the waveforms until the transient current completely stops. Note, however, that the above advantageous effects (i.e., the advantageous effects achieved by the rectifier circuit according to an aspect of the present disclosure) can be obtained.

As illustrated in FIG. 9, the rectifier circuit 1 can make the SR1I sufficiently large at the RP1 unlike the example of the diagram (a) in FIG. 8. Furthermore, at the RP1, the rectifier 1 can further make the SR1I smaller than a positive RCI (a rectification current). Moreover, at the RP1, the rectifier 1 can make the PW1I smaller than the SR1I. Such features can effectively reduce the transient current as seen above.

Modification: Adding Snubber Circuit

In the rectifier circuit 1 according to the first embodiment, a snubber circuit is omitted for the sake of simplicity. Note that, as a matter of course, a known snubber circuit may be provided to the rectifier circuit 1 as appropriate. An example of the snubber circuit may include an RC snubber circuit or an RCD snubber circuit (an RC snubber circuit provided with a diode (D)). Alternatively, the snubber circuit may be an active snubber circuit (a snubber circuit including a transistor).

Modification: Scope in Application of Rectifier

The first embodiment shows as an example a case where the first rectifier FR1 is a cascode GaN-HEMT, and the second rectifier SR1 is an SiC-SBD. Note, however, that the first rectifier FR1 and the second rectifier SR1 may be of any given kind as long as the rectifiers are included in the scope of the rectifiers described above. Similarly, the switch element (e.g., the switch element TT1) may be of any given kind as long as the switch element functions as a switch.

An example of the first rectifier FR1 may be an FRD, or an SiC-SBD. Alternatively, an example of the second rectifier SR1 may be an FRD, or a GaN-HEMT. Use of a GaN-HEMT as the second rectifier SR1 makes it possible to perform synchronous rectification.

Moreover, as can be seen, if the first rectifier is an IGBT including diodes connected together in inverse parallel, the rectifier circuit 1 per se can be used as a circuit having the switch function. Specifically, with the switching of the first rectifier FR1 between ON and OFF alone, a current from the first terminal FT1 to the second terminal ST2 is controlled to flow or stop. In this case, as to the direction of a voltage to be applied to the rectifier circuit 1, the first terminal FT1 has a positive polarity.

Second Embodiment

Figure 10:
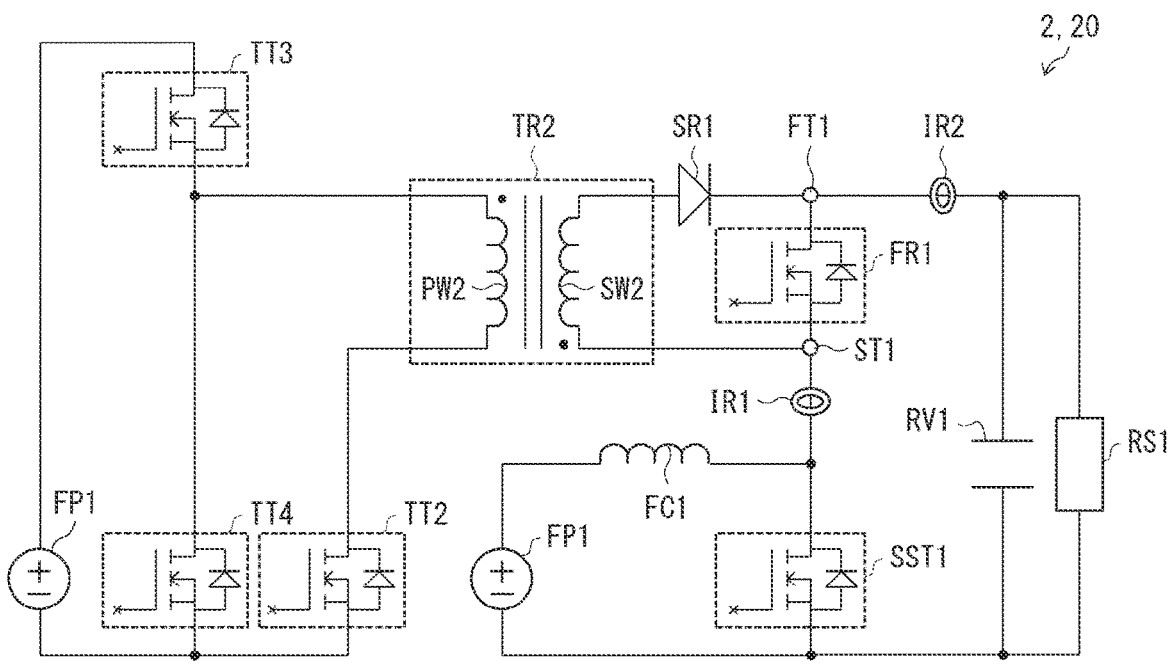
FIG. 10 is a circuit diagram of a power supply circuit according to a second embodiment.

FIG. 10 is a circuit diagram of a power supply circuit 20 according to a second embodiment. A rectifier circuit according to the second embodiment is referred to as a rectifier circuit 2. In the rectifier circuit 2, the power supply TP1 of the rectifier circuit 1 is replaced with another power supply FP1. That is, in the power supply circuit 20, an input power supply (the power supply FP1) for a step-up chopper also serves as a power supply for the rectifier circuit 2. Such a feature makes it possible to reduce the total number of the power supplies in the power supply circuit 20, contributing to reduction of costs.

Moreover, in the rectifier circuit 2, the switch element TT1 of the rectifier circuit 1 is replaced with switch elements TT2, TT3, and TT4. A transformer of the rectifier circuit 2 is referred to as a transformer TR2. In the transformer TR2, a primary winding and a secondary winding are respectively referred to as a primary winding PW2 and a secondary winding SW2. The rectifier circuit 2 is a modification of the rectifier circuit 1 whose circuitry to the primary winding is modified. The switch elements TT2 to TT4 are connected to the primary winding PW2. The switch elements TT2 to TT4 are similar to the switch element TT1. As necessary, parameters of the switch elements TT2 to TT4 may be revised.

The primary winding PW2 has a positive electrode (with a black dot) connected to a source of the switch element TT3 and to a drain of the switch element TT4. Whereas, the primary winding PW2 has a negative electrode (without a black dot) connected to a drain of the switch element TT2. The power supply FP1 has a positive electrode connected to a drain of the switch element TT3. Whereas, the power supply FP1 has a negative electrode connected to sources of the respective switch elements TT2 and TT4.

Voltage to be Applied to Switch Element TT1 of Rectifier Circuit 1

Before specific description of the rectifier circuit 2, described here is a voltage to be applied to the switch element TT1 of the rectifier circuit 1 (see FIG. 1 again). Considered here is a case where a voltage is applied to the secondary winding SW1 when the switch element TT1 is OFF.

For example, considered here is a case where a voltage of the first terminal FT1 with respect to the second terminal ST1 rises in the conduction period of the second rectifier SR1. In this case, a voltage is applied to the secondary winding SW1. Hence, a high voltage of up to 400 V is applied to the secondary winding SW1 as a secondary voltage. Hence, in the primary winding SW1, a primary voltage corresponding to the secondary voltage is generated, depending on the ratio of turns in the transformer TR1. In the above example, the N1 is nine and the N2 is six, and the primary voltage is obtained as follows: 400V×9/6=600 V.

The direction of the primary voltage is the same as that of the voltage of the power supply TP1 (see the polarity of the primary winding PW1 indicated by the black dot of the primary winding PW1). Hence, a high voltage of 615 V in total (a voltage of 600 V to the primary winding and a voltage of 15 V from the power supply TP1) is applied to the switch element TT1. Taking such effects as ringing into consideration, a voltage of over 650 V could be instantaneously applied to the switch element TT1.

As can be seen, the switch element TT1 can stand a high voltage for a short period of time. Hence, no particular problem develops even if a voltage of 615 V is applied to the switch element TT1. Note that the power supply TP1 having a voltage of 15 V is used in the first embodiment to minimize a voltage to be added to the voltage to the primary winding PW1. Thanks to this feature, the first embodiment can provide the rectifier circuit 1 using one switch element TT1.

However, a problem develops if the power supply FP1 is also used as a power supply of the rectifier circuit 1 as seen in the second embodiment. In this case, applied to the switch element TT1 is a voltage of 800 V in total (a voltage of 600 V to the primary winding and a voltage of 200 V from the power supply FP1), which is higher than the voltage in the above example. This problem could cause a breakdown of the switch element TT1.

Advantageous Effects of Rectifier Circuit 2

The rectifier circuit 2 in FIG. 10 is intended to prevent application of an excessively high voltage to a switch element connected to a primary winding. In the rectifier circuit 2, both of the switch elements TT2 and TT3 are turned ON to allow a current to flow in the primary winding PW2 (to execute the second step). When the current PW1I reaches a predetermined amount, the switch element TT3 is turned OFF. After that, the switch element TT2 is turned OFF. When the switch element TT3 is turned OFF, a voltage of a connection node between the switch elements TT3 and TT4 falls because of an effect of a current flowing in, for example, leakage inductance.

When a voltage is applied to the secondary winding SW2 with both of the switch elements TT2 and TT3 turned OFF, a voltage is generated in the primary winding PW2. Note that because the switch element TT3 is OFF, a sum of the voltage of the primary winding PW1 (e.g., 200 V) and the voltage of the power supply FP1 (e.g., 200 V) cannot be directly applied to the switch element TT2. As a result, the voltage to be applied to the switch element TT2 can be reduced to approximately 600 V (the voltage of the primary winding PW2). Such a feature can prevent breakdown of the switch element TT2.

The rectifier circuit 2 does not necessarily include the switch element TT4. Note that, when the switch element TT4 operates complementarily to the switch element TT3, the three advantageous effects below can be achieved.

First, a bootstrap circuit can be used to supply power to drive the gate of the switch element TT3. The bootstrap circuit is inexpensive, contributing to reducing costs for supplying power to the gate.

Second, it is easy to ground a connection node between the switch elements TT3 and TT4. The connection node is grounded when a return current due to linkage inductance of the primary winding PW2 flows in the switch element TT4 as a forward current.

Third, when the switch element TT4 is forced to turn ON, one of the terminals of the primary winding PW2 can be reliably grounded. Such a feature makes it possible to reliably maintain a voltage of the one terminal to 0 V.

Third Embodiment

Figure 11:
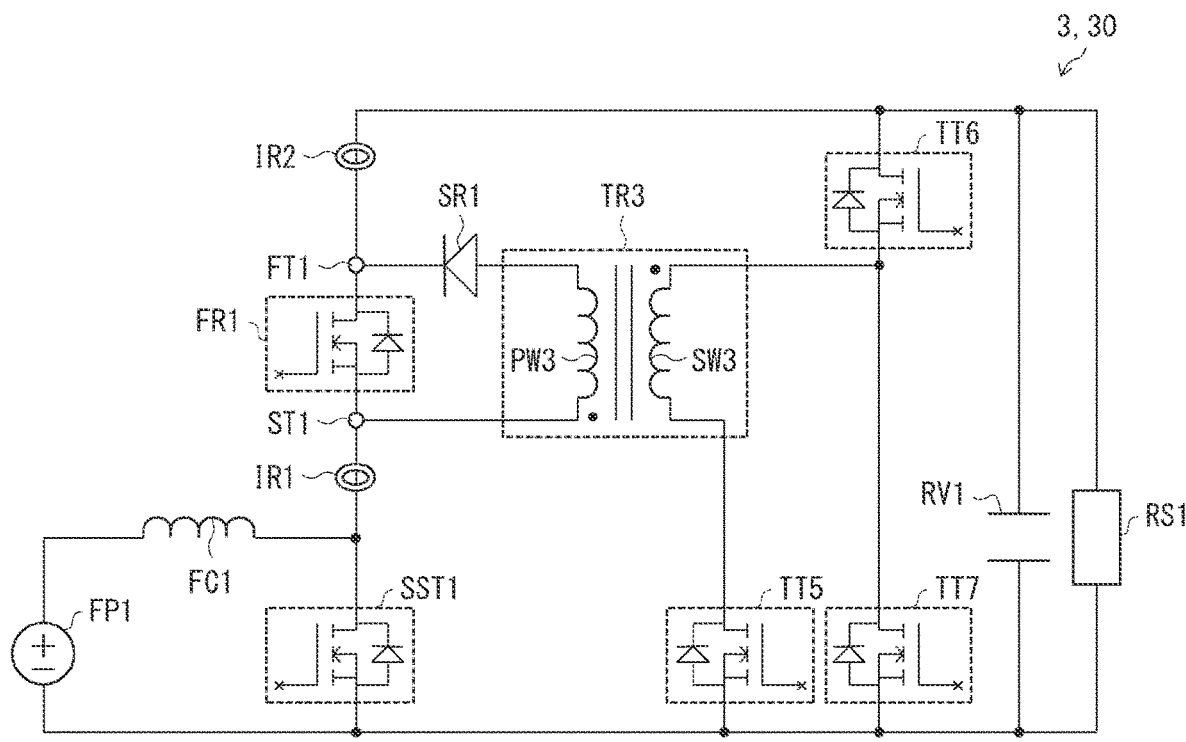
FIG. 11 is a circuit diagram of a power supply circuit according to a third embodiment.

FIG. 11 is a circuit diagram of a power supply circuit 30 according to a third embodiment. A rectifier circuit of the third embodiment is referred to as a rectifier circuit 3. In the rectifier circuit 3, the power supply TP1 of the rectifier circuit 1 is replaced with the capacitor RV1. That is, in the power supply circuit 30, the smoothing capacitor (the capacitor RV1) of the step-up chopper serves as the power supply of the rectifier circuit 3. Such a feature makes it possible to reduce the total number of the power supplies in the power supply circuit 30, contributing to reduction of costs.

Moreover, in the rectifier circuit 3, the switch element TT1 of the rectifier circuit 1 is replaced with switch elements TT5, TT6, and TT7. A transformer of the rectifier circuit 3 is referred to as a transformer TR3. In the transformer TR3, a primary winding and a secondary winding are respectively referred to as a primary winding PW3 and a secondary winding SW3. The rectifier circuit 3 is another modification of the rectifier circuit 1 whose circuitry to the primary winding is modified. Hence, the rectifier circuit 3 may also be a modification of the rectifier circuit 2.

The switch element TT5 of the rectifier circuit 3 is similar in function to the switch element TT2 of the rectifier circuit 2. The switch elements TT6 and TT7 of the rectifier circuit 3 are respectively similar in function to the switch elements TT3 and TT4 of the rectifier circuit 2. Applied to the primary winding PW3 is a voltage of 400 V from the capacitor RV1 acting as the power supply of the rectifier circuit 3. That is, the rectifier circuit 3 uses a primary voltage higher than that of the rectifier circuit 2. The rectifier circuit 3 can also prevent breakdown of the switch element TT5, as the rectifier circuit 2 can.

Fourth Embodiment

A rectifier circuit (e.g., the rectifier circuit 1) according to an aspect of the present disclosure is applicable to any given power supply circuit (e.g., the power supply circuit 10) required to have a rectification function. Examples of the power supply circuit include a step-up chopper circuit, a step-down chopper circuit, a bi-directional chopper circuit, an inverter circuit, a PFC circuit, and an insulated DC-DC converter.

Figure 12:
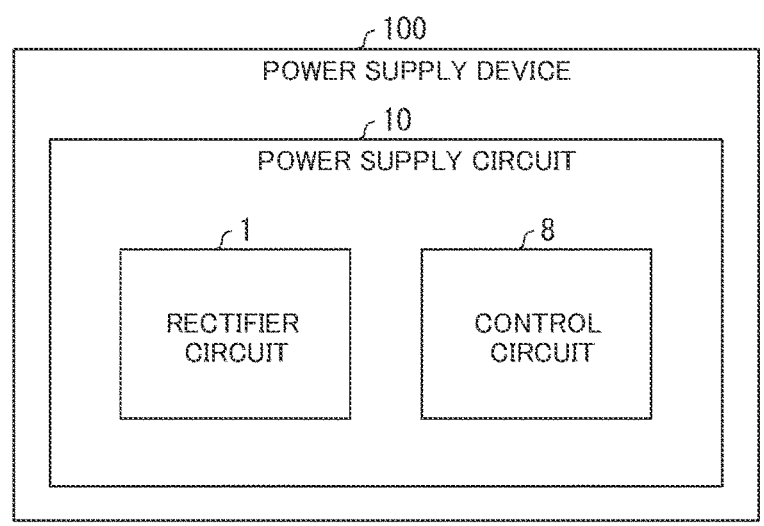
FIG. 12 is a diagram of a power supply device according to a fourth embodiment.

FIG. 12 is a diagram of a power supply device 100 including the power supply circuit 10 (a power supply circuit including the rectifier circuit 1). The rectifier circuit 1 can curb loss of the power supply circuit 10 and the power supply device 100 Moreover, the power supply device 100 includes the control circuit 8. The control circuit 8 controls the units of the power supply circuit 10. More specifically, the control circuit 8 causes the elements of the power supply circuit 10 to selectively turn ON and OFF. The first to fourth steps may be executed by the control circuit 8 causing the elements of the power supply circuit 10 to selectively turn ON and OFF.

SUMMARY

A rectifier circuit according to an aspect of the present disclosure includes: a first terminal; and a second terminal. With reference to the first terminal, a positive voltage to be applied to the second terminal is a forward voltage. With reference to the second terminal, a positive voltage to be applied to the first terminal is a reverse voltage. If the forward voltage is applied, a forward rectifier circuit current flows from the second terminal to the first terminal. If the reverse voltage is applied, the forward rectifier circuit current is blocked. The rectifier circuit further includes: a first rectifier connected to the first terminal and the second terminal; a transformer including a primary winding and a secondary winding; a second rectifier connected in parallel to the first rectifier through the secondary winding; a switch element connected to the primary winding; and a power supply connected to the primary winding. When the switch element is turned ON, a primary winding current flows from the power supply to the primary winding. When the switch element is turned OFF, a second rectifier current flows from the secondary winding to the second rectifier. During a period in which the second rectifier current is flowing, the reverse voltage is applied.

As can be seen, when the reverse voltage is applied to the rectifier circuit, (e.g., when the forward rectifier circuit current is blocked), a transient current (a reverse rectifier circuit current) is generated. In order to reduce loss of the circuit, the transient current has to be reduced. Thus, the inventor has found out the above features on the basis of the idea of using magnetic energy stored in the transformer to reduce the transient current.

The above features make it possible to cancel out the transient current for the amount of the second rectifier current (a current derived from the magnetic energy). That is, the transient current can be effectively reduced. The reduction in the transient current also contributes to effective reduction in loss of the circuit.

The rectifier circuit according to the first aspect is a second aspect of the present disclosure. In the rectifier circuit, the period in which the second rectifier current is flowing may be as long as, or shorter than, half of a period in which the primary winding current flows.

Such a feature makes it possible to reduce an increase in loss due to the second rectifier current, contributing to effective reduction in loss of the circuit.

The rectifier circuit according to the first aspect or the second aspect is a third aspect of the present disclosure. In the rectifier circuit, during a period in which the forward rectifier circuit current is flowing in the first rectifier, the second rectifier current may start to flow.

Such a feature makes it possible to prevent the second rectifier current from quickly decreasing as time passes. Hence, the second rectifier current can reduce the transient current more effectively.

The rectifier circuit according to any one of the first to third aspects is a fourth aspect of the present disclosure. The rectifier circuit may further include a specific path from the first terminal through the first rectifier to the second terminal, wherein the secondary winding may have an inductance twice as high as, or higher than, an inductance of the specific path.

Such a feature also makes it possible to prevent the second rectifier current from quickly decreasing as time passes. Hence, the second rectifier current can reduce the transient current more effectively.

The rectifier circuit according to any one of the first to fourth aspects is a fifth aspect of the present disclosure. In the rectifier circuit, the primary winding may be formed into more turns than the secondary winding is.

Such a feature makes it possible to reduce a primary winding current. Hence, loss of the primary winding PW1 can be reduced. In addition, the feature also makes it possible to reduce loss in the switch element TT1. Hence, loss in the rectifier circuit can be reduced more effectively.

A power supply device according to a sixth aspect of the present disclosure may include the rectifier circuit according to any one of the first to fifth aspects.

Such a feature achieves advantageous effects similar to those of the rectifier circuit according to an aspect of the present disclosure.

A method according to a seventh aspect of the present disclosure is a rectifier circuit drive method for driving a rectifier circuit including: a first terminal; and a second terminal. In the rectifier circuit, with reference to the first terminal, a positive voltage to be applied to the second terminal is a forward voltage, with reference to the second terminal, a positive voltage to be applied to the first terminal is a reverse voltage, if the forward voltage is applied, a forward rectifier circuit current flows from the second terminal to the first terminal, and if the reverse voltage is applied, the forward rectifier circuit current is blocked. The rectifier circuit further includes: a first rectifier connected to the first terminal and the second terminal; a transformer including a primary winding and a secondary winding; a second rectifier connected in parallel to the first rectifier through the secondary winding; a switch element connected to the primary winding; and a power supply connected to the primary winding. The rectifier circuit drive method includes: applying the forward voltage, so that the forward rectifier circuit current flows; turning the switch element ON after the applying the forward voltage, so that a primary winding current flows from the power supply to the primary winding; turning the switch element OFF after the turning the switch element ON, so that a second rectifier current flows from the secondary winding to the second rectifier; and applying the reverse voltage, after the turning the switch element OFF, during a period in which the second rectifier current is flowing.

Such a feature achieves advantageous effects similar to those of the rectifier circuit according to an aspect of the present disclosure.

ADDITIONAL REMARKS

An aspect of the present disclosure shall not be limited to the embodiments described above, and can be modified in various manners within the scope of claims. The technical aspects disclosed in different embodiments are to be appropriately combined together to implement another embodiment. Such an embodiment shall be included within the technical scope of the present invention. Moreover, the technical aspects disclosed in each embodiment are combined to achieve a new technical feature.

CROSS-REFERENCE TO RELATED APPLICATION

The present application claims priority to Japanese Patent Application No. 2018-114858, filed on Jun. 15, 2018, the contents of which are incorporated herein by reference in its entirety.

The invention claimed is:

1. A rectifier circuit, comprising:
a first terminal; and a second terminal,
with reference to the first terminal, a positive voltage to be applied to the second terminal being a forward voltage,
with reference to the second terminal, a positive voltage to be applied to the first terminal being a reverse voltage,
if the forward voltage is applied, a forward rectifier circuit current flowing from the second terminal to the first terminal, and
if the reverse voltage is applied, the forward rectifier circuit current being blocked;
the rectifier circuit further comprising:
a first rectifier connected to the first terminal and the second terminal;
a transformer including a primary winding and a secondary winding;
a second rectifier connected in parallel to the first rectifier through the secondary winding;
a switch element connected to the primary winding; and
a power supply connected to the primary winding, wherein
when the switch element is turned ON, a primary winding current flows from the power supply to the primary winding,
when the switch element is turned OFF, a second rectifier current flows from the secondary winding to the second rectifier,
a period in which the second rectifier current is flowing is shorter than a period in which the primary winding current is flowing,
during a period in which the forward rectifier circuit current is flowing in the first rectifier, the second rectifier current starts to flow, and
during the period in which the second rectifier current is flowing, the reverse voltage is applied.

2. The rectifier circuit according to claim 1, further comprising
a specific path from the first terminal through the first rectifier to the second terminal, wherein
the secondary winding has an inductance twice as high as, or higher than, an inductance of the specific path.

3. The rectifier circuit according to claim 1, wherein
a number of turns of the primary winding is greater than a number of turns of the secondary winding.

4. A power supply device comprising the rectifier circuit according to claim 1.

* * * * *